(12) United States Patent
Miyachi et al.

(10) Patent No.: US 8,415,845 B2
(45) Date of Patent: Apr. 9, 2013

(54) MOTOR

(75) Inventors: Shuhei Miyachi, Okazaki (JP); Hideki Kabune, Nagoya (JP); Katsuji Kawai, Kosai (JP); Hiroshi Imai, Toyohashi (JP)

(73) Assignees: Denso Corporation, Kariya (JP); ASMO Co., Ltd., Kosai (JP)

( * ) Notice: Subject to any disclaimer, the term of this patent is extended or adjusted under 35 U.S.C. 154(b) by 413 days.

(21) Appl. No.: 12/822,635

(22) Filed: Jun. 24, 2010

(65) Prior Publication Data
US 2010/0327680 A1 Dec. 30, 2010

(30) Foreign Application Priority Data

Jun. 24, 2009 (JP) ................................ 2009-149649
Jan. 28, 2010 (JP) ................................ 2010-16581

(51) Int. Cl.
*H02K 5/22* (2006.01)
*H02K 3/28* (2006.01)

(52) U.S. Cl.
USPC .......................................... 310/71; 310/68 D

(58) Field of Classification Search ............... 310/71, 310/68 D, 179–184, 400.27
See application file for complete search history.

(56) References Cited

U.S. PATENT DOCUMENTS

| 5,455,500 | A | 10/1995 | Shichijyo et al. |
| 5,900,687 | A | 5/1999 | Kondo et al. |
| 7,663,277 | B2 * | 2/2010 | Kinoshita et al. ............... 310/71 |
| 7,768,240 | B2 * | 8/2010 | Takekawa ....................... 322/28 |
| 8,120,218 | B2 * | 2/2012 | Ikeda et al. ..................... 310/71 |
| 8,212,512 | B2 * | 7/2012 | Maeda et al. ................. 318/432 |
| 2004/0090130 | A1 * | 5/2004 | Kaneko et al. .................... 310/58 |
| 2008/0136265 | A1 | 6/2008 | Mizukoshi et al. |

FOREIGN PATENT DOCUMENTS

| JP | 5-4745 | 1/1993 |
| JP | 6-113517 | 4/1994 |
| JP | 10-234158 | 9/1998 |
| JP | 10-322973 | 12/1998 |
| JP | 2002-48099 | 2/2002 |
| JP | 2004-23877 | 1/2004 |
| JP | 2004-236470 | 8/2004 |
| JP | 2004-364352 | 12/2004 |
| JP | 2005-328654 | 11/2005 |
| JP | 2007-215299 | 8/2007 |

(Continued)

OTHER PUBLICATIONS

U.S. Appl. No. 12/822,412, Minato et al, filed Jun. 24, 2010.

(Continued)

*Primary Examiner* — Tran Nguyen
*Assistant Examiner* — Leda Pham
(74) *Attorney, Agent, or Firm* — Nixon & Vanderhye PC

(57) ABSTRACT

In a motor, a stator with a three-phase winding set and a rotor are located in an operation region of a motor casing having a side wall. An inverter circuit constructed with power modules is located in a control region that is located on the opposite side of the operation region across the side wall in an axial direction of the motor. Each power module has a pair of transistors and a common terminal connected to the pair of transistors. A lead of a winding corresponding to one phase and a lead of a winding corresponding to another phase extend in the axial direction to cross over from the operation region to the control region and are connected together to the common terminal of a corresponding power module.

15 Claims, 24 Drawing Sheets

FOREIGN PATENT DOCUMENTS

| | | |
|---|---|---|
| JP | 2007-330035 | 12/2007 |
| JP | 2008-131794 | 6/2008 |
| JP | 2008-312393 | 12/2008 |
| WO | WO 2010/150527 | 12/2010 |
| WO | WO 2010/150528 | 12/2010 |
| WO | WO 2010/150529 | 12/2010 |
| WO | WO 2010/150530 | 12/2010 |

OTHER PUBLICATIONS

U.S. Appl. No. 12/822,396, Yamasaki et al, filed Jun. 24, 2010.
U.S. Appl. No. 12/822,403, Fujita et al, filed Jun. 24, 2010.
U.S. Appl. No. 12/822,614, Fujita et al, filed Jun. 24, 2010.
U.S. Appl. No. 12/822,381, Iwai et al, filed Jun. 24, 2010.
U.S. Appl. No. 12/822,627, Yamasaki et al, filed Jun. 24, 2010.

* cited by examiner

MOTOR

CROSS REFERENCE TO RELATED APPLICATION

This application is based on and incorporates herein by reference Japanese Patent Application No. 2009-149649 filed on Jun. 24, 2009 and No. 2010-016581 filed on Jan. 28, 2010.

FIELD OF THE INVENTION

The present invention relates to a motor with a built-in drive circuit, in which a driving device and a wiring are accommodated together in a motor casing having a simple outer shape.

BACKGROUND OF THE INVENTION

There has been proposed an electric power steering for providing steering assist to a driver of a vehicle. In the electric power steering, a motor rotates only when the steering assist is needed. Therefore, the electric power steering has better fuel efficiency than a hydraulic power steering.

Recently, space for accommodating a motor in the electric power steering has been reduced as the number of parts mounted on the vehicle has increased. Further, there has been an increasing demand for the motor to have a fail-safe feature that ensures safety.

In a motor disclosed in JP-2005-328654A, JP-2008-312393A, JP-10-248187A corresponding to U.S. Pat. No. 5,900,687, and JP-2007-330035A, a holder for holding wires of windings of a stator is mounted to an end of the stator in an axial direction, and the wires extend in a circumferential direction inside the holder so that the windings can be electrically connected to a connector that supplies electrical power to the windings.

However, mouthing the holder to the end of the stator in the axial direction can increase the size of the motor in axial and radial directions of the motor. For example, in a conventional brushless motor shown in FIGS. 24A and 24B, a lead wire 101 of a three-phase winding set 100 of a stator is caused to extend in a circumferential direction by a busbar 104 inside a holder 103 that is mounted outside an operation region 102, where the stator is located, in an axial direction. Then, the lead wire 101 is electrically connected to a switching element 106 through a connector 105 of the holder 103 so that the three-phase winding set 100 can be supplied with electric power from the switching element 106. As can be seen from FIGS. 24A and 24B, the size of the motor in axial and radial directions is increased due to the holder 103.

In a motor disclosed in JP-2007-215299A, a wire of each winding is connected to a corresponding switching element.

However, connecting the wire of each winding to the corresponding switching element may increase the number of connection points between the winding and the switching element. Accordingly, wiring of the winding to the switching element may be complicated.

SUMMARY OF THE INVENTION

In view of the above, it is an object of the present invention to provide a motor with a built-in drive circuit, in which a winding and a switching element are connected in a simple manner so that a motor size can be reduced. It is another object of the present invention to provide a motor with a built-in drive circuit having a fail-safe feature.

According to an aspect of the present invention, a motor includes a motor casing, a stator, a rotor, and driving modules. The motor casing has a surrounding wall that extends in an axial direction of the motor. The stator is fixed to the surrounding wall of the motor casing and includes stator poles projecting in a radial direction. The stator further includes windings wound around the stator poles to form a three-phase winding set. The stator generates a rotating magnetic field, when the three-phase winding set is energized. The rotor has N and S poles that are alternately arranged in a rotation direction. The rotor faces the stator in the radial direction to rotate with the rotating magnetic field in the rotation direction. The driving modules are located on the opposite side of the stator and the rotor in the axial direction. The driving modules form an inverter circuit for generating three phase alternating current to energize the three-phase winding set. Each driving module has a pair of switching elements and a common terminal connected to the pair of switching elements. One switching element serves as a power supply side switching element, and the other switching element serves as a ground side switching element. The windings have a jumping wire and a lead wire. The jumping wire extends in a first direction perpendicular to the axial direction at an end of the stator in the axial direction and is connected between different windings. The lead wire extends in the axial direction and is connected to the common terminal.

According to another aspect of the present invention, a motor includes a motor casing, a stator, and a rotor. The motor casing has a surrounding wall that extends in an axial direction of the motor. The motor casing further has a side wall. The side wall is located at an end of the surrounding wall in the axial direction and projects in a radial direction. The stator is fixed to the surrounding wall of the motor casing. The stator includes stator poles projecting in a radial direction and windings wound around the stator poles to form three-phase winding sets. The stator generates a rotating magnetic field, when the three-phase winding sets are energized. The rotor has N and S poles that are alternately arranged in a rotation direction. The rotor faces the stator in the radial direction to rotate with the rotating magnetic field in the rotation direction. The three-phase winding sets are energized and controlled by independent inverter circuits.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

Embodiments of the present invention are described below with reference to the drawings.

First Embodiment

Figure 3:
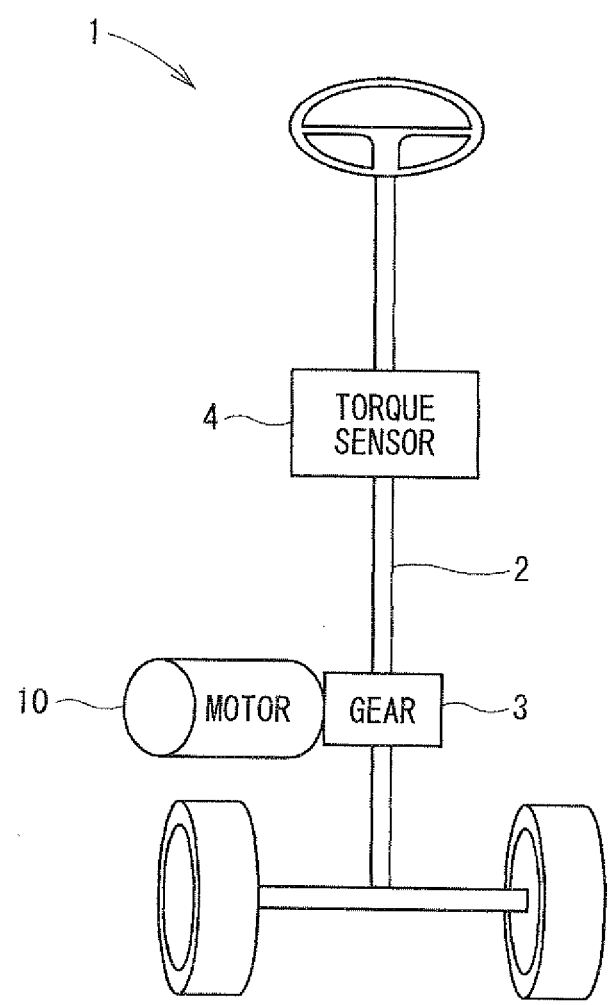
FIG. 3 is a diagram illustrating an electric power steering employing the motor according to the first embodiment.

As shown in FIG. 3, a motor 10 according to a first embodiment of the present invention is a brushless motor used in an electric power steering 1. The motor 10 engages with a gear 3 of a column shaft 2 and rotates both in forward and reverse directions based on a vehicle speed signal sent via, for example, a controller area network (CAN) and a steering torque signal detected by a torque sensor 4, thereby producing steering assist force.

Figure 1:
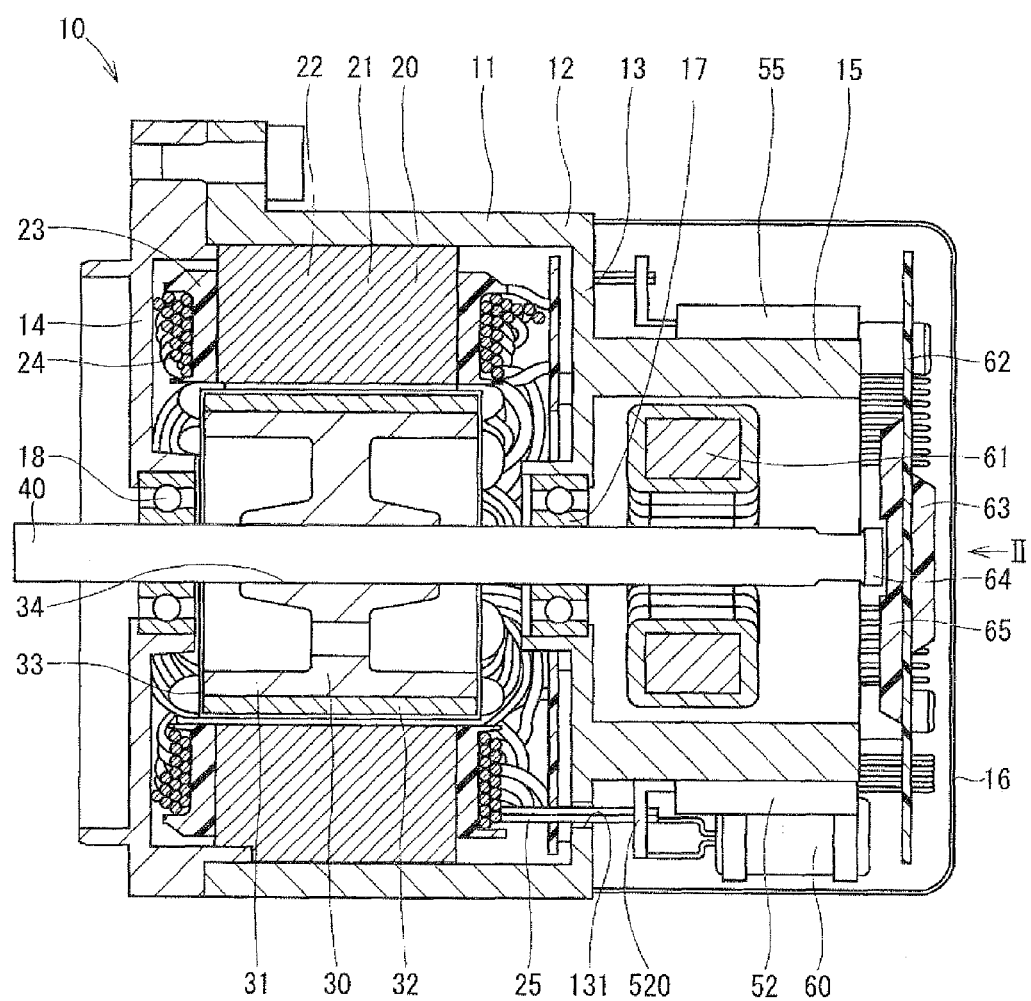
FIG. 1 is a diagram illustrating a cross-sectional view of a motor according to a first embodiment of the present invention.

As shown in FIG. 1, the motor 10 includes a housing 11 as a motor casing, a cover 16, a stator 20, a rotor 30, a shaft 40, and power modules 51-56 serving as drive modules.

For example, the housing 11 can be made of aluminum and have a substantially tubular shape. According to the first embodiment, the housing 11 includes a tube portion 12 as a surrounding wall, first and second side walls 13, 14, and a heatsink 15. The tube portion 12 has a tubular shape. The first and second side walls 13, 14 are joined to first and second ends of the tube portion 12 in an axial direction of the motor 10, respectively. The heatsink 15 is integrally formed with the first side wall 13 and projects from the first side wall 13 in the axial direction.

The cover 16 has a shape like a tube with a bottom. The cover 16 is substantially coaxial with the housing 11 on the heatsink 15 side and protects the power modules 51-56.

It is noted that a space inside the housing 11 is herein defined as an "operation region" and that a space inside the cover 16 is herein defined as a "control region".

The stator 20 is located on an inner wall of the housing 11 in a radial direction of the housing 11. That is, the stator 20 is located on the inner wall of the tube portion 12.

The stator 20 includes twelve stator poles 21 projecting inwardly from the inner wall of the housing 11 in the radial direction and a coil wire 24 wound around the stator poles 21. The stator poles 21 are substantially equally spaced from each other in a circumferential direction of the housing 11. Each stator pole 21 has a laminated iron core 22 and an insulator 23. The laminated iron core 22 is formed by laminating thin plates of a magnetic material. The insulator 23 is fitted outside of the laminated iron core 22. The coil wire 24 is wound around each stator pole 21 through the insulator 23 in a concentrated winding manner to from a three-phase winding set.

A lead 25 of the coil wire 24 extends straightly in the axial direction toward the control region and protrudes into the control region through a hole 131 in the first side wail 13 of the housing 11. According to the first embodiment, six holes 131 are formed in the first side wall 13, and two leads 25 extending parallel to each other pass through a corresponding hole 131 so as to cross over from the operation region to the control region. Then, each two lead wires is connected to a corresponding one of common terminals 510, 520, 530, 540, 550, and 560 of the power modules 51-56 at a position radially outside the power modules 51-56.

Figure 6:
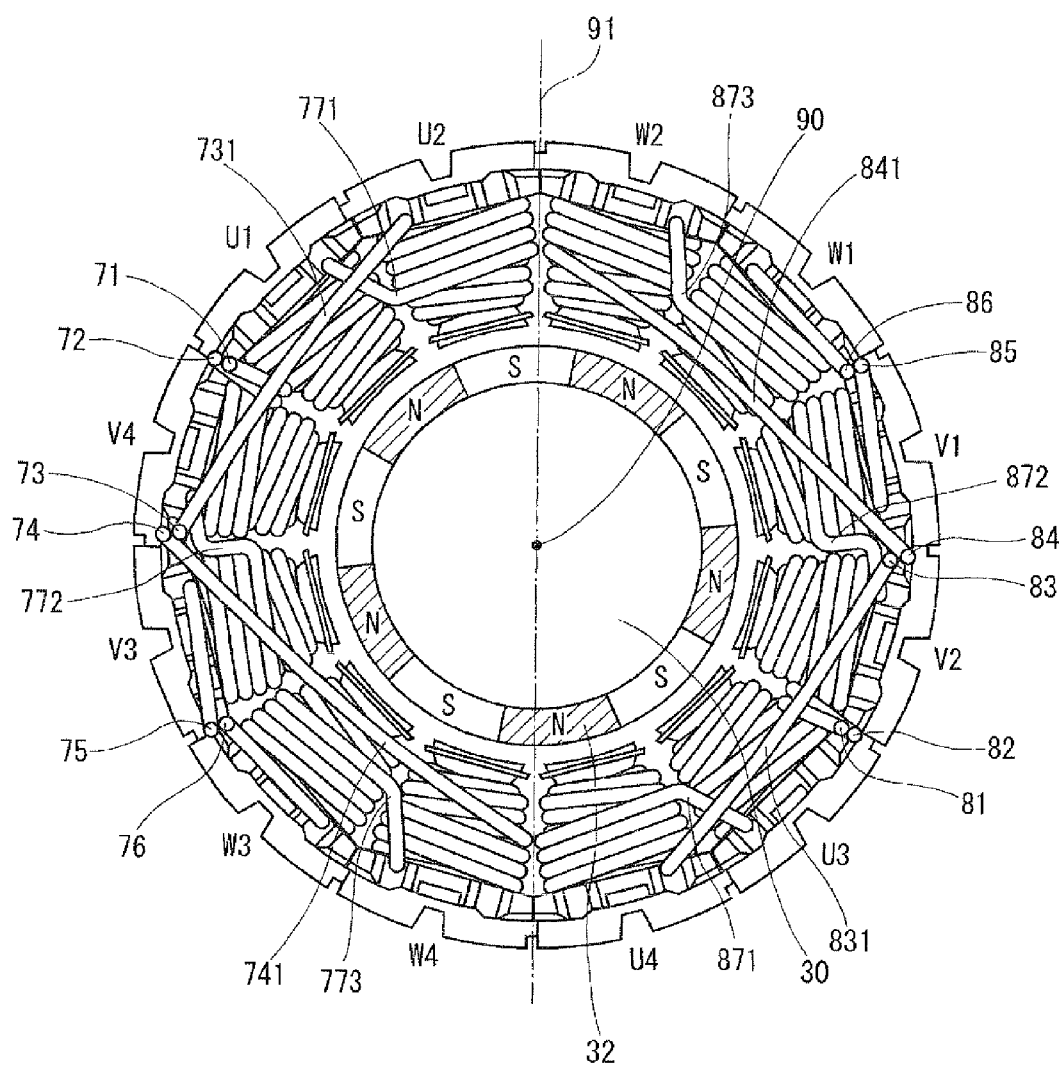
FIG. 6 is a diagram illustrating a plan view of a stator and a rotor of the motor according to the first embodiment.

The rotor 30 is located radially inside the stator 20 and configured to rotate with respect to the stator 20. For example, the rotor 30 can have a tubular shape and made of a magnetic material such as iron. The rotor 30 includes a rotor core 31, a permanent magnet 32 located radially outside the rotor core 31, and a rotor cover 33 that covers the rotor core 31 and the permanent magnet 32. As shown in FIG. 6, the permanent magnet 32 has five N-poles and five S-poles that are alternately arranged in a rotation direction of the motor 10 (i.e., rotation direction of the rotor 30).

The shaft 40 is fixed to a shaft hole 34 of the rotor core 31. The shaft hole 34 is located in the center of the rotor core 31 in the axial direction. Bearings 17, 18 are provided in the first and second side walls 13, 14 and fitted onto first and second end portions of the shaft 40 in the axial direction, respectively. Thus, the rotor 30 and the shaft 40 can collectively rotate with respect to the housing 11 and the stator 20.

Figure 2:
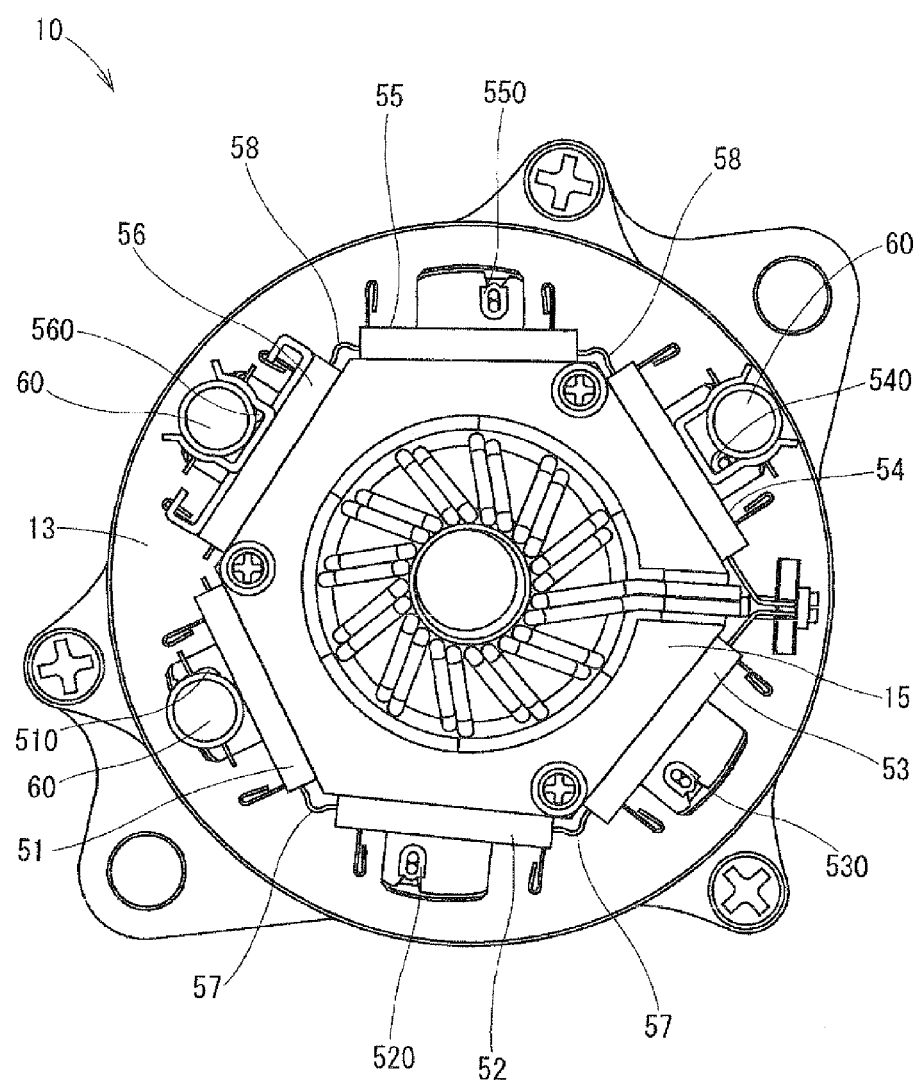
FIG. 2 is a diagram illustrating a view from a direction of an arrow II in FIG. 1, in which a circuit board is omitted.

As shown in FIGS. 1 and 2, the six power modules 51-56 are mounted on an outer wall of the heatsink 15 and substantially equally spaced from each other in the rotation direction. Each of the power modules 51-56 has at least two transistors as switching elements. Examples of such transistors can include power metal-oxide semiconductor field-effect transistors (MOSFETs). The three power modules 51-53 are electrically connected together by busbars 57. The other three power modules 54-56 are electrically connected together by busbars 58. Each of the power modules 51-56 and the corresponding bulbar are molded with resin.

For example, as shown in FIGS. 1 and 2, the power modules 51-56 can be vertically mounted on the heatsink 15 in such a manner that a normal to a chip surface of each of the power modules 51-56 is substantially perpendicular to a center axis of the shaft 40. The power modules 51-56 have the common terminals 510, 520, 530, 540, 550, 560, respectively. Each of the common terminals 510, 520, 530, 540, 550, 560 extends from a side facing the first side wall 13 toward the first side wall 13, is bent radially outwardly, and connected to corresponding two leads 25. For example, each of the common terminals 510, 520, 530, 540, 550, 560 can be connected to the corresponding two leads 25 by squeezing the corresponding two leads 25 at the same time and welding a tip of each of the common terminals 510, 520, 530, 540, 550, 560 to the corresponding two leads 25.

An aluminum electrolytic capacitor 60 is located radially outside or inside the power modules 51-56. The aluminum electrolytic capacitor 60 serves to absorb a surge voltage that is caused by a switching of the transistors of the power modules 51-56. Further, a choke coil 61 is located radially inside the heatsink 15. The choke coil 61 serves to reduce power supply noise.

A circuit board 62 is fixed to an end of the heatsink 15 in the axial direction. An integrated circuit (IC), a microcomputer, and a pre-driver are mounted on the circuit board 62 and form a control circuit 63. A permanent magnet 64 is fixed to the first end of the shaft 40. A position sensor 65 is mounded on the circuit board 62 to face the permanent magnet 64 and detects a direction of a magnetic field of the permanent magnet 64. The control circuit 63 detects a position of the rotor 30 based on a detection signal outputted from the position sensor 65 and applies a drive signal to the transistors.

Figure 4:
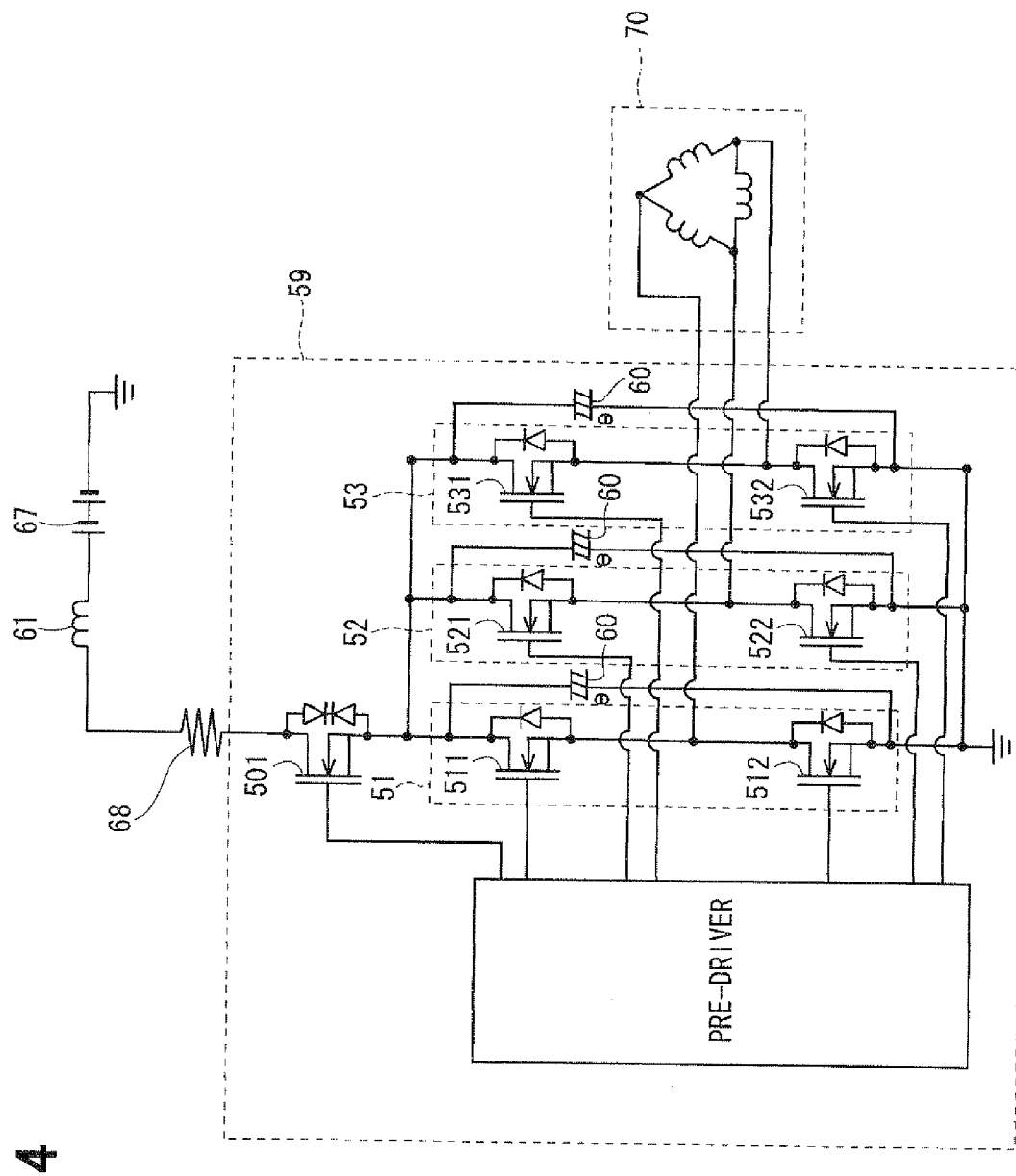
FIG. 4 is a circuit diagram of an inverter circuit of the motor according to the first embodiment.

As shown in FIG. 4, the power modules 51-53 form a first inverter circuit 59 for generating a three-phase alternating current (AC) power. The coil wire 24 is wound around the stator poles 21 of the stator 20 to form windings. The windings are connected in a delta configuration to form a three-phase winding set 70.

Although not shown in the drawings, the power modules 54-56 form a second inverter circuit for generating a three-phase AC power. The second inverter circuit is substantially the same as the first inverter circuit 59. The coil wire 24 is wound around the stator poles 21 of the stator 20 to form windings. The windings are connected in a delta configuration to form a three-phase winding set 80.

The power module 51 includes a power supply side switching element 511 and a ground side switching element 512 that are connected to a first U-phase of the three-phase winding set 70. The power module 52 includes a power supply side switching element 521 and a ground side switching element 522 that are connected to a first V-phase of the three-phase winding set 70. The power module 53 includes a power supply side switching element 531 and a ground side switching element 532 that are connected to a first W-phase of the three-phase winding set 70.

When the drive signal is applied by the pre-driver to the transistors, an electric current flows from a battery 67 to the first inverter circuit 59 through the choke coil 61, a shunt resistor 68, and a transistor 501. It is noted that the transistor 501 serves to protect the first inverter circuit 59. Then, the three-phase winding set 70 is energized by the three-phase AC power and generates the rotating magnetic field that allows the rotor 30 to rotate both in forward and reverse directions with respect to the stator 20.

Figure 5:
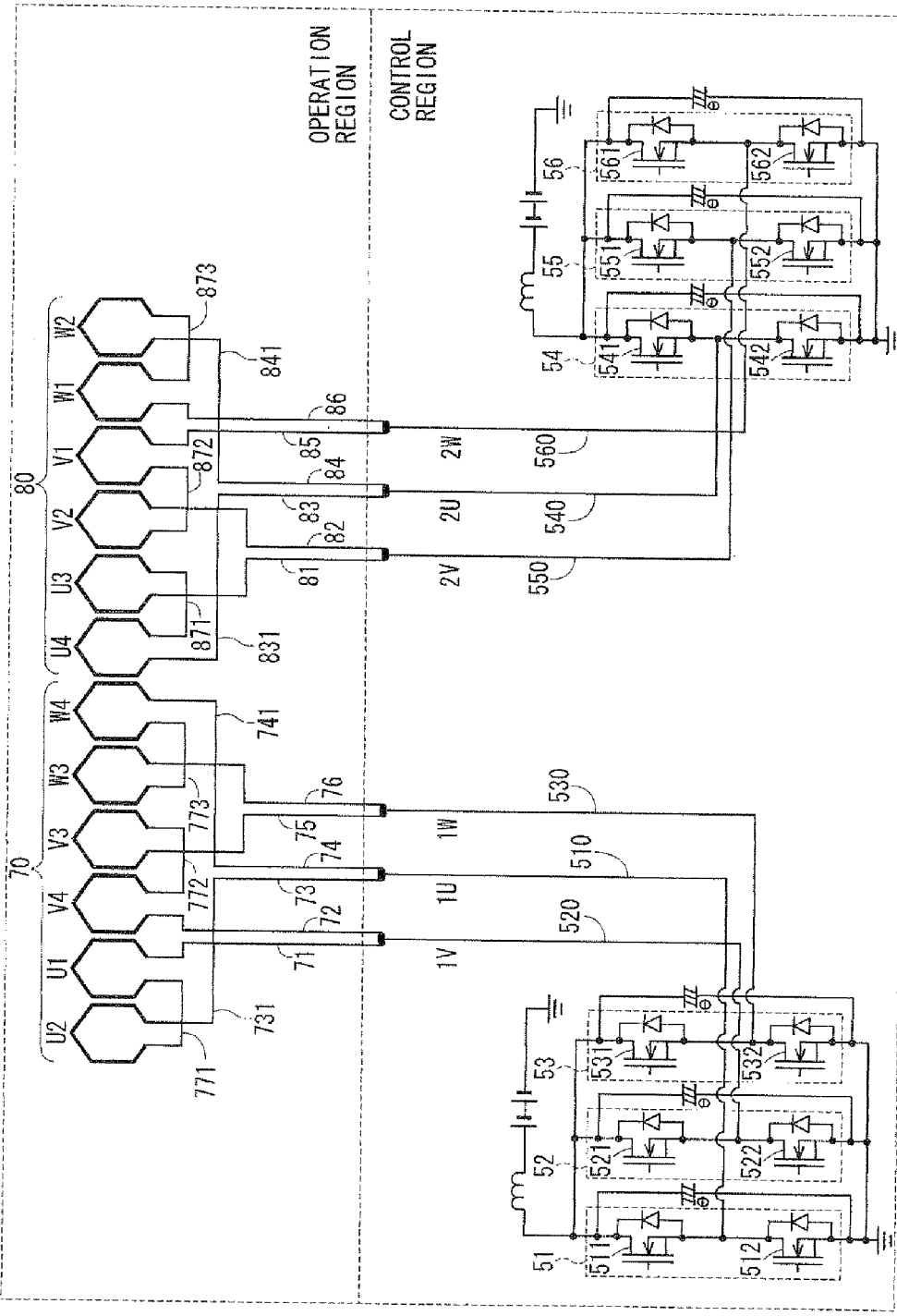
FIG. 5 is a circuit diagram of the motor according to the first embodiment.

Next, a method for connecting the windings of each three-phase winding set is described below with reference to FIGS. 5 and 6.

The coil wire 24 of the stator 20 is wound around twelve stator poles to form twelve windings U1-U4, V1-V4, and W1-W4.

The twelve windings are paired up. Each pair of the windings is connected in series and corresponds to one phase. Specifically, a pair of the windings U2, U1 corresponds to the first U-phase, a pair of the windings V4, V3 corresponds to the first V-phase, and a pair of the windings W3, W4 corresponds to the first W-phase. The pair of the windings U2, U1, the pair of the windings V4, V3, and the pair of the windings W3, W4 are connected in a delta configuration to form the three-phase winding set 70.

Likewise, a pair of the windings U4, U3 corresponds to a second U-phase, a pair of the windings V2, V1 corresponds to a second V-phase, and a pair of the windings W1, W2 corresponds to a second W-phase. The pair of the windings U4, U3, the pair of the windings V2, V1, and the pair of the windings W1, W2 are connected in a delta configuration to form the three-phase winding set 80.

The three-phase winding sets 70, 80 are controlled by independent control systems. As shown in FIG. 6, the pair of the windings U2, U1, the pair of the windings V4, V3, and the pair of the windings W3, W4 of the three-phase winding set 70 are arranged adjacent in the rotation direction of the rotor 30. Likewise, the pair of the windings U4, U3, the pair of the windings V2, V1, and the pair of the windings W1, W2 of the three-phase winding set 80 are arranged adjacent in the rotation direction of the rotor 30. Further, the three-phase winding sets 70, 80 are arranged adjacent to each other in the rotation direction of the rotor 30 so that the three-phase winding sets 70, 80 can be located opposite to each other with respect to an imaginary plane 91 including a rotation axis 90 of the rotor 30. Since the same phase windings of the three-phase winding sets 70, 80 are arranged in the same order in the rotation direction of the rotor 30, the same phase windings of the three-phase winding sets 70, 80 are symmetrically arranged with respect to the rotation axis 90. For example, the U-phase windings U1, U3 of the three-phase winding sets 70, 80 are symmetrically arranged with respect to the rotation axis 90.

In each of the three-phase winding sets 70, 80, adjacent windings are wound in opposite directions. In other words, the windings of each pair corresponding to one phase are wound in opposite directions. Specifically, in the three-phase winding set 70, the windings U2, U1 are wound in opposite directions, the windings V4, V3 are wound in opposite directions, and the windings W3, W4 are wound in opposite directions. Likewise, in the three-phase winding set 80, the windings U4, U3 are wound in opposite directions, the windings V2, V1 are wound in opposite directions, and the windings W1, W2 are wound in opposite directions. When energized, the windings of each pair corresponding to one phase generate magnetic fields in opposite directions.

In each of the three-phase winding sets 70, 80, adjacent windings are connected together by a jumping wire extending in a direction perpendicular to the axial direction. In other words, the windings of each pair corresponding to one phase are connected together by the jumping wire. Specifically, in the three-phase winding sets 70, the windings U2, U1 are connected together by a wire 771 extending in the direction perpendicular to the axial direction, the windings V4, V3 are connected together by a wire 772 extending in the direction perpendicular to the axial direction, and the windings W3, W4 are connected together by a wire 773 extending in the direction perpendicular to the axial direction. Likewise, in the three-phase winding set 80, the windings U4, U3 are connected together by a wire 871 extending in the direction perpendicular to the axial direction, the windings V2, V1 are connected together by a wire 872 extending in the direction perpendicular to the axial direction, and the windings W1, W2 are connected together by a wire 873 extending in the direction perpendicular to the axial direction.

Next, a method for connecting the windings of each three-phase winding set to the drive modules of a corresponding inverter circuit is described below with reference to FIGS. 5 and 6.

In the three-phase winding set 70, a lead 71 of the winding U1 corresponding to the first U-phase and a lead 72 of the winding V4 corresponding to the first V-phase extend parallel to each other in the axial direction from a position between the windings U1, V4 to cross over from the operation region to the control region and are directly connected to the common terminal 520 of the power supply side switching element 521 and the ground side switching element 522 of the power module 52 corresponding to the first V-phase.

A lead 731 of the winding U2 corresponding to the first U-phase extends to a position between the windings V4, V3 within the operation region. A lead 741 of the winding W4 corresponding to the first W-phase extends to the position between the windings V4, V3 within the operation region. In this way, the lead 731 of the winding U2 and the lead 741 of the winding W4 approach each other at the position between the windings V4, V3. It is noted that the two leads 731, 741 extend straightly in a direction perpendicular to the axial direction so as to approach each other.

The leads 731, 741 are bent at the position between the windings V4, V3 to form portions 73, 74, respectively. The portions 73, 74 of the leads 731, 741 extend parallel to each other in the axial direction to cross over from the operation region to the control region. The portions 73, 74 of the leads 731, 741 are connected to the common terminal 510 of the power supply side switching element 511 and the ground side switching element 512 of the power module 51 corresponding to the first U-phase.

A lead 75 of the winding V3 corresponding to the first V-phase and a lead 76 of the winding W3 corresponding to the first W-phase approach each other at a position between the windings V3, W3. The leads 75, 76 extend parallel to each other in the axial direction from the position between the windings V3, W3 to cross over from the operation region to the control region and are connected to the common terminal 530 of the power supply side switching element 531 and the ground side switching element 532 of the power module 53 corresponding to the first W-phase.

In the three-phase winding set 80, a lead 81 of the winding U3 corresponding to the second U-phase and a lead 82 of the winding V2 corresponding to the second V-phase extend parallel to each other in the axial direction from a position between the windings U3, V2 to cross over from the operation region to the control region and are connected to the common terminal 550 of the power supply side switching element 551 and the ground side switching element 552 of the power module 55 corresponding to the second V-phase.

A lead 831 of the winding U4 corresponding to the second U-phase extends to a position between the windings V2, V1 within the operation region. A lead 841 of the winding W2 corresponding to the second W-phase extends to the position between the windings V2, V1 within the operation region. In this way, the lead 831 of the winding U4 and the lead 841 of the winding W2 approach each other at the position between the windings V2, V1. It is noted that the two leads 831, 841 extend straightly in a direction perpendicular to the axial direction so as to approach each other.

The leads 831, 841 are bent at the position between the windings V2, V1 to form portions 83, 84, respectively. The portions 83, 84 of the leads 831, 841 extend parallel to each other in the axial direction to cross over from the operation region to the control region. The portions 83, 84 of the leads 831, 841 are connected to the common terminal 540 of the power supply side switching element 541 and the ground side switching element 542 of the power module 54 corresponding to the second U-phase.

A lead 85 of the winding V1 corresponding to the second V-phase and a lead 86 of the winding W1 corresponding to the second W-phase approach each other at a position between the windings V1, W1. The leads 85, 86 extend parallel to each other in the axial direction from the position between the windings V1, W1 to cross over from the operation region to the control region and are directly connected to the common terminal 560 of the power supply side switching element 561 and the ground side switching element 562 of the power module 56 corresponding to the second W-phase.

As described above, although the leads 731, 741, 831, 841 extend in the direction perpendicular to the axial direction, the leads 71-76, 81-86 extend in the axial direction to cross over from the operation region to the control region.

Figure 7A:
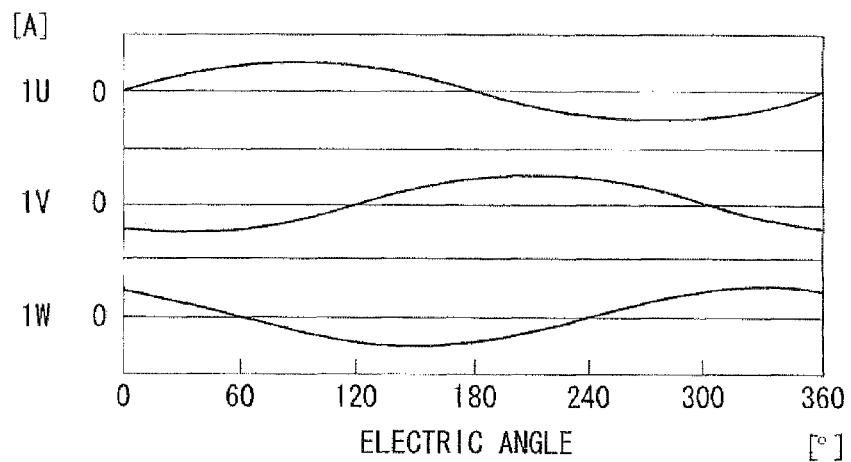
FIGS. 7A and 7B are diagrams illustrating an energization pattern for the motor according to the first embodiment.

FIG. 7A illustrates three-phase alternating currents generated by the first inverter circuit 59 constructed with the three power modules 51-53 that are connected to the three-phase winding set 70. A first U-phase alternating current supplied to the first U-phase, a first V-phase alternating current supplied to the first V-phase, and a first W-phase alternating current supplied to the first W-phase are displaced from each other by 120 electrical degrees so that the three-phase winding set 70 can generate a rotating magnetic field.

Figure 7B:
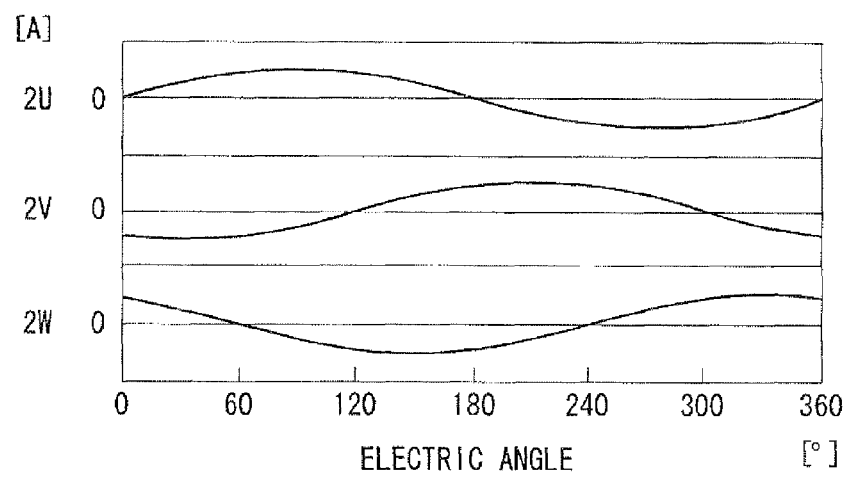

FIG. 7B illustrates three-phase alternating currents generated by the second inverter circuit constructed with the three power modules 54-56 that are connected to the three-phase winding set 80. A second U-phase alternating current supplied to the second U-phase, a second V-phase alternating current supplied to the second V-phase, and a second W-phase alternating current supplied to the second W-phase are displaced from each other by 120 electrical degrees so that the three-phase winding set 80 can generate a rotating magnetic field.

The first U-phase alternating current and the second U-phase alternating current are synchronized with each other, the first V-phase alienating current and the second V-phase alternating current are synchronized with each other, and the first W-phase alienating current and the second W-phase alternating current are synchronized with each other. Therefore, the same phase windings of the three-phase winding sets 70, 80 are energized at the same time and generate attracting force at the same time. Further, as mentioned previously, the same phase windings of the three-phase winding sets 70, 80 are symmetrically arranged with respect to the rotation axis 90. Thus, uneven distribution of a gap between the stator 20 and the rotor 30 is reduced. Accordingly, eccentricity of the rotor 30 is reduced so that a torque ripple can be reduced.

Figure 8A:
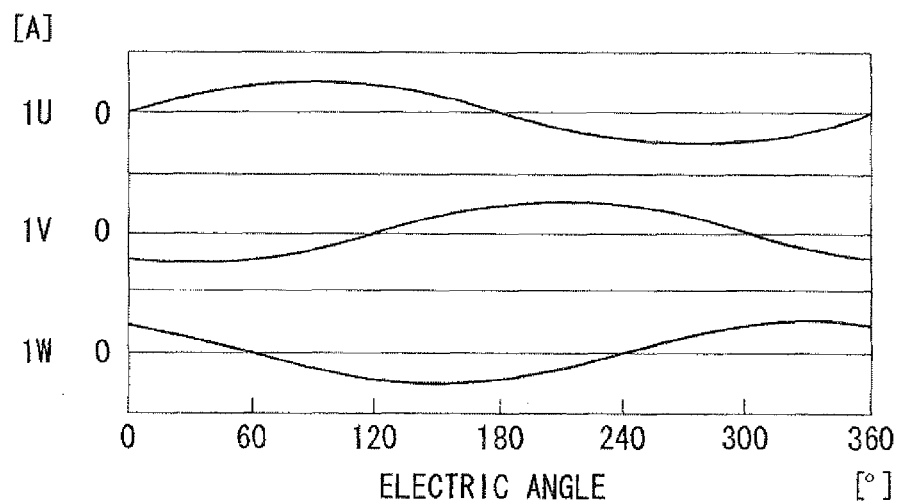
FIGS. 8A and 8B are diagrams illustrating another energization pattern for the motor according to the first embodiment.
Figure 8B:
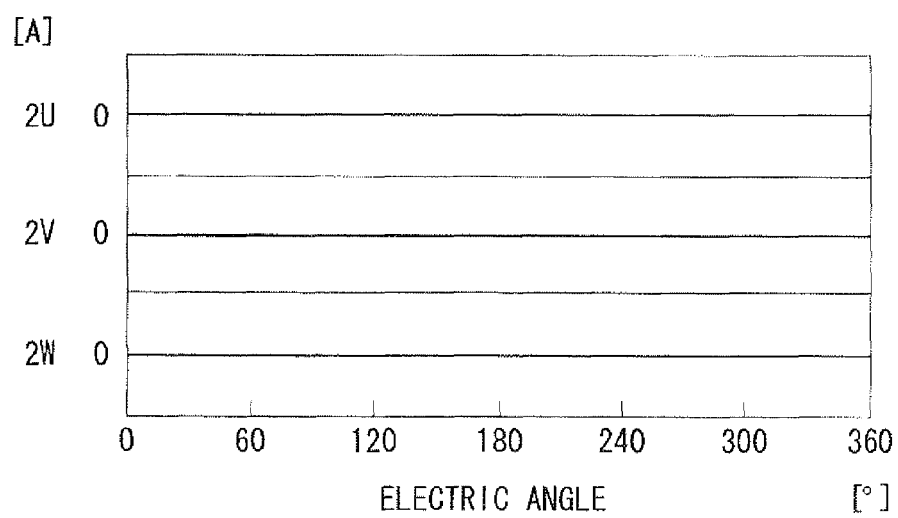

FIGS. 8A, 8B illustrate a case where energization of one control system is stopped.

As shown in FIG. 8A, the three-phase alternating currents generated by the first inverter circuit 59 constructed with the three power modules 51-53 are normal. In contrast, as shown in FIG. 8B, the three-phase alternating currents generated by the second inverter circuit constructed with the three power modules 54-56 are stopped. Therefore, although the three-phase winding set 70 is energized, the three-phase winding set 80 is not energized.

Even in the case of FIGS. 8A, 8B, the rotor 30 can rotate both in forward and reverse directions by the rotating magnetic filed generated by the three-phase winding set 70. In this way, the three-phase winding sets 70, 80 are energized and controlled by the independent inverter circuits. Thus, the motor 10 is configured in a redundant manner and can have a fail-safe feature.

As described above, according to the first embodiment, the leads 71-76 of the windings of the three-phase winding set 70 and the leads 81-86 of the windings of the three-phase winding set 80 extend straightly in the axial direction to cross over from the operation region to the control region and are directly connected to the common terminals 510, 520, 530, 540, 550, 560 of the power supply side switching elements and the ground side switching elements of the power modules 51-56. The leads of the windings are paired, and the leads of each pair extend parallel so that the leads of each pair can be directly connected to the corresponding common terminal without being welded to a busbar or the like. In such an approach, the number of connection points between the winding and the switching element is reduced so that wiring of the three-phase winding sets 70, 80 to the power modules 51-56 can be simplified.

Further, according to the first embodiment, the three-phase winding sets 70, 80 are arranged adjacent to each other in the rotation direction of the rotor 30 so that the three-phase winding sets 70, 80 can be located opposite to each other with respect to the imaginary plane 91 including the rotation axis 90 of the rotor 30. Accordingly, the jumping wires 771-773, 871-873 and the leads 731, 741, 831, 841 extend straightly within an area defined by the stator poles of the stator 20 in the radial direction. Thus, a wiring layout of the jumping wires and the leads is simplified so that the three-phase winding sets 70, 80 can be connected to the power modules 51-56 without busbars and a holder for holding the busbars. Therefore, the size of the motor 10 in the axial direction can be reduced.

Furthermore, according to the first embodiment, the three-phase winding sets 70, 80 are connected to the power modules 51-56 by a short length of wire so that ohmic loss can be reduced. Therefore, the motor 10 can be efficiently driven. Further, since the motor 10 is configured in a redundant manner, the motor 10 can be reliably driven.

Furthermore, according to the first embodiment, the six windings of each of the three-phase winding sets 70, 80 can be formed by winding a single coil wire 24 around the six stator poles. Therefore, a process of forming the windings can be simplified.

Second Embodiment

A second embodiment of the present invention is described below with reference to FIGS. 9, 10. A difference of the second embodiment from the first embodiment is as follows.

Figure 9:
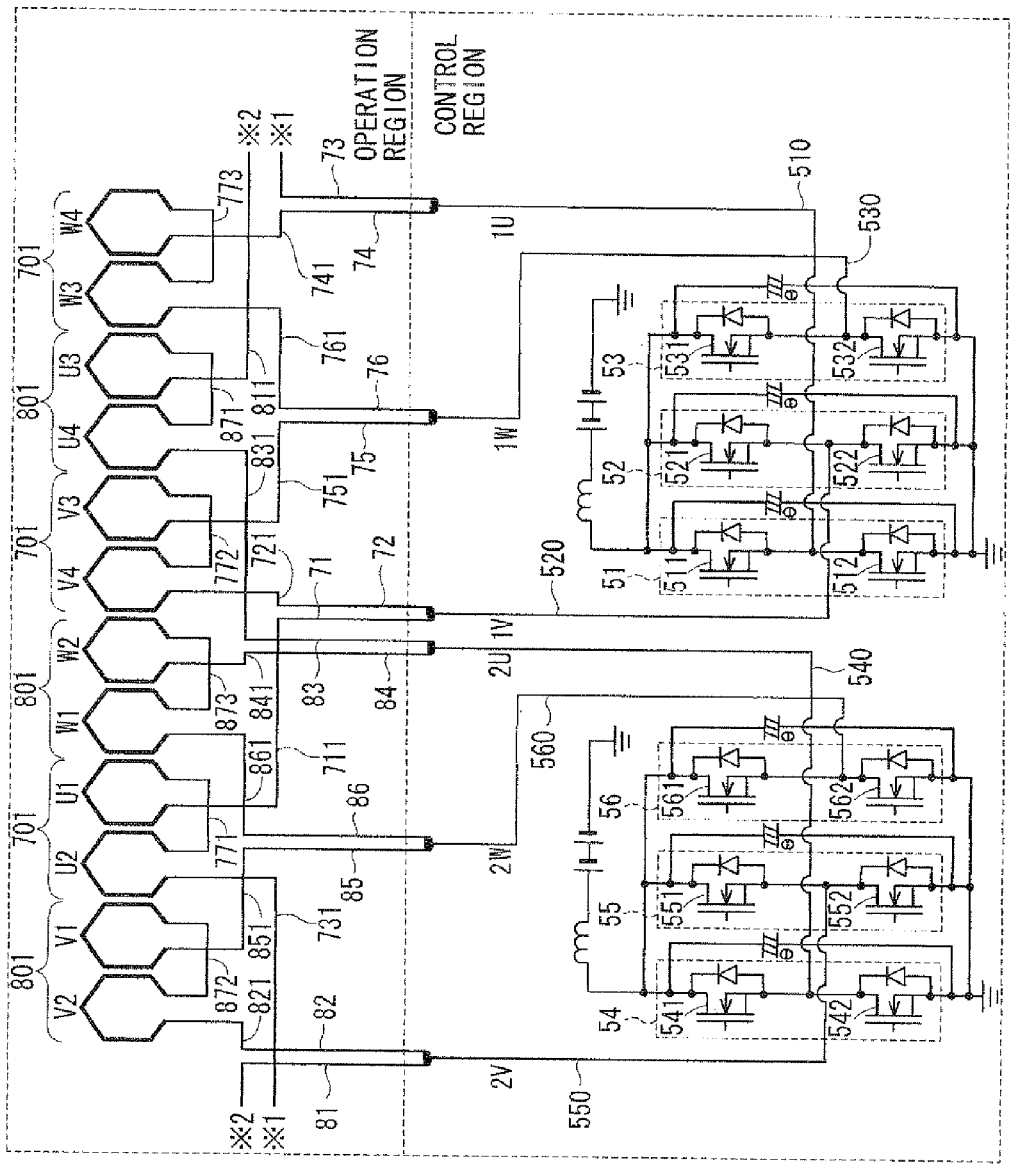
FIG. 9 is a circuit diagram of a motor according to a second embodiment of the present invention.
Figure 10:
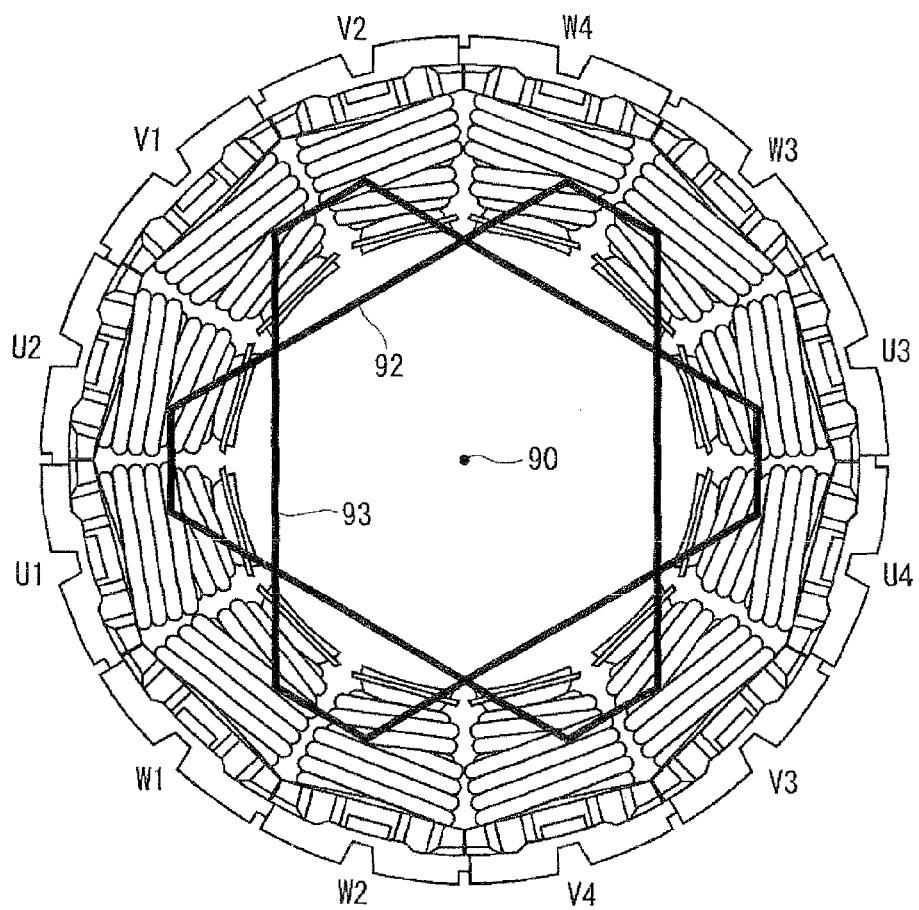
FIG. 10 is a diagram illustrating a plan view of the motor according to the second embodiment.

As shown in FIG. 9, according to the second embodiment, the pair of windings W1, W2 of a three-phase winding set 801 is located between the pair of windings U1, U2 and the pair of windings V4, V3 of a three-phase winding set 701. Likewise, the pair of windings U4, U3 of the three-phase winding set 801 are located between the pair of windings V4, V3 and the pair of windings W3, W4 of the three-phase winding set 701. Likewise, the pair of windings V2, V1 of the three-phase winding set 801 are located between the pair of windings W3, W4 and the pair of windings U2, U1 of the three-phase winding set 701. Therefore, as indicated by a solid line 92 in FIG. 10, the pair of windings U2, U1, the pair of windings V4, V3, and the pair of windings W3, W4 of the three-phase winding set 701 are spaced about 120 degrees apart. Likewise, as indicated by a solid line 93 in FIG. 10, the pair of windings U4, U3, the pair of windings V2, V1, and the pair of windings W1, W2 of the three-phase winding set 801 are spaced about 120 degrees apart.

It is noted that the same phase windings of the three-phase winding sets 70, 80 are symmetrically arranged with respect to the rotation axis 90.

Next, a method for connecting the windings of each three-phase winding set to the drive modules of a corresponding inverter circuit is described below with reference to FIG. 9.

In the three-phase winding set 701, a lead 721 of the winding V4 corresponding to the first V-phase and a lead 711 of the winding U1 corresponding to the first U-phase approach each other at a first position. The leads 721, 711 are bent at the first position to form portions 72, 71, respectively. The portions 72, 71 of the leads 821, 711 extend parallel to each other in the axial direction to cross over from the operation region to the control region. The portions 72, 71 of the leads 721, 711 are directly connected to the common terminal 520 of the power supply side switching element 521 and the ground side switching element 522 of the power module 52 corresponding to the first V-phase.

A lead 731 of the winding U2 corresponding to the first U-phase and a lead 741 of the winding W4 corresponding to the first W-phase approach each other at a second position. The leads 731, 741 are bent at the second position to form portions 73, 74, respectively. The portions 73, 74 of the leads 731, 741 extend parallel to each other in the axial direction to cross over from the operation region to the control region. The portions 73, 74 of the leads 731, 741 are directly connected to the common terminal 510 of the power supply side switching element 511 and the ground side switching element 512 of the power module 51 corresponding to the first U-phase.

A lead 761 of the winding W3 corresponding to the first W-phase and a lead 751 of the winding V3 corresponding to the first V-phase approach each other at a third position. The leads 761, 751 are bent at the third position to form portions 76, 75, respectively. The portions 76, 75 of the leads 761, 751 extend parallel to each other in the axial direction to cross over from the operation region to the control region. The portions 76, 75 of the leads 761, 751 are directly connected to the common terminal 530 of the power supply side switching element 531 and the ground side switching element 532 of the power module 53 corresponding to the first W-phase.

In the three-phase winding set 801, a lead 821 of the winding V2 corresponding to the second V-phase and a lead 811 of the winding U3 corresponding to the second U-phase approach each other at a fourth position. The leads 821, 811 are bent at the fourth position to form portions 82, 81, respectively. The portions 82, 81 of the leads 821, 811 extend parallel to each other in the axial direction to cross over from the operation region to the control region. The portions 82, 81 of the leads 821, 811 are directly connected to the common terminal 550 of the power supply side switching element 551 and the ground side switching element 552 of the power module 55 corresponding to the second V-phase.

A lead 831 of the winding U4 corresponding to the second U-phase and a lead 841 of the winding W2 corresponding to the second W-phase approach each other at a fifth position. The leads 831, 841 are bent at the fifth position to form portions 83, 84, respectively. The portions 83, 84 of the leads 831, 841 extend parallel to each other in the axial direction to cross over from the operation region to the control region. The portions 83, 84 of the leads 831, 841 are directly connected to the common terminal 540 of the power supply side switching element 541 and the ground side switching element 542 of the power module 54 corresponding to the second U-phase.

A lead 861 of the winding W1 corresponding to the second W-phase and a lead 851 of the winding V1 corresponding to the second V-phase approach each other at a sixth position. The leads 861, 851 are bent at the sixth position to form portions 86, 85, respectively. The portions 86, 85 of the leads 861, 851 extend parallel to each other in the axial direction to cross over from the operation region to the control region. The portions 86, 85 of the leads 861, 851 are directly connected to the common terminal 560 of the power supply side switching element 561 and the ground side switching element 562 of the power module 56 corresponding to the second W-phase.

As described above, according to the second embodiment, the leads 71-76 of the three-phase winding set 701 and the leads 81-86 of the three-phase winding set 801 extend parallel to each other in the axial direction to cross over from the operation region to the control region and are directly connected to the common terminals 510, 520, 530, 540, 550, 560 of the power supply side switching elements and the ground side switching elements of the power modules 51-56. In such an approach, the number of connection points between the winding and the switching element is reduced so that wiring of the three-phase winding sets 701, 801 to the power modules 51-56 can be simplified.

Further, according to the second embodiment, the leads 711, 721, 731, 741, 751, 761 of the three-phase winding set 701 and the leads 811, 821, 831, 841, 851, 861 of the three-phase winding set 801 are straightly connected to the power modules 51-56 to overlap in the radial direction within the operation region but not to overlap in the axial direction. Therefore, the three-phase winding sets 701, 801 are connected to the power modules 51-56 in a simple manner without busbars for causing the leads to extend in the circumferential direction and also without a holder for holding the busbars. Accordingly, the size of the motor 10 in the axial direction can be reduced.

Furthermore, according to the second embodiment, the same phase windings of the three-phase winding sets 701, 801 are symmetrically arranged with respect to the rotation axis 90 and energized at the same time so as to generate attracting force at the same time. Thus, uneven distribution of a gap between the stator 20 and the rotor 30 is reduced. Accordingly, eccentricity of the rotor 30 is reduced so that a torque ripple can be reduced.

Even in a case where energization of one control system is stopped, the rotor 30 can rotate both in forward and reverse directions by the rotating magnetic filed generated by the three-phase winding set 701 or the three-phase winding set 801. In this case, since the windings of the three-phase winding set are spaced about 120 degrees apart, eccentricity of the rotor 30 is reduced.

It is noted that the six windings of each of the three-phase winding sets 701, 801 can be formed by winding a single coil wire 24 around the six stator poles. Therefore, a process of forming the windings can be simplified.

Third Embodiment

A third embodiment of the present invention is described below with reference to FIGS. 11-13. A difference of the third embodiment from the preceding embodiments is as follows.

Figure 11:
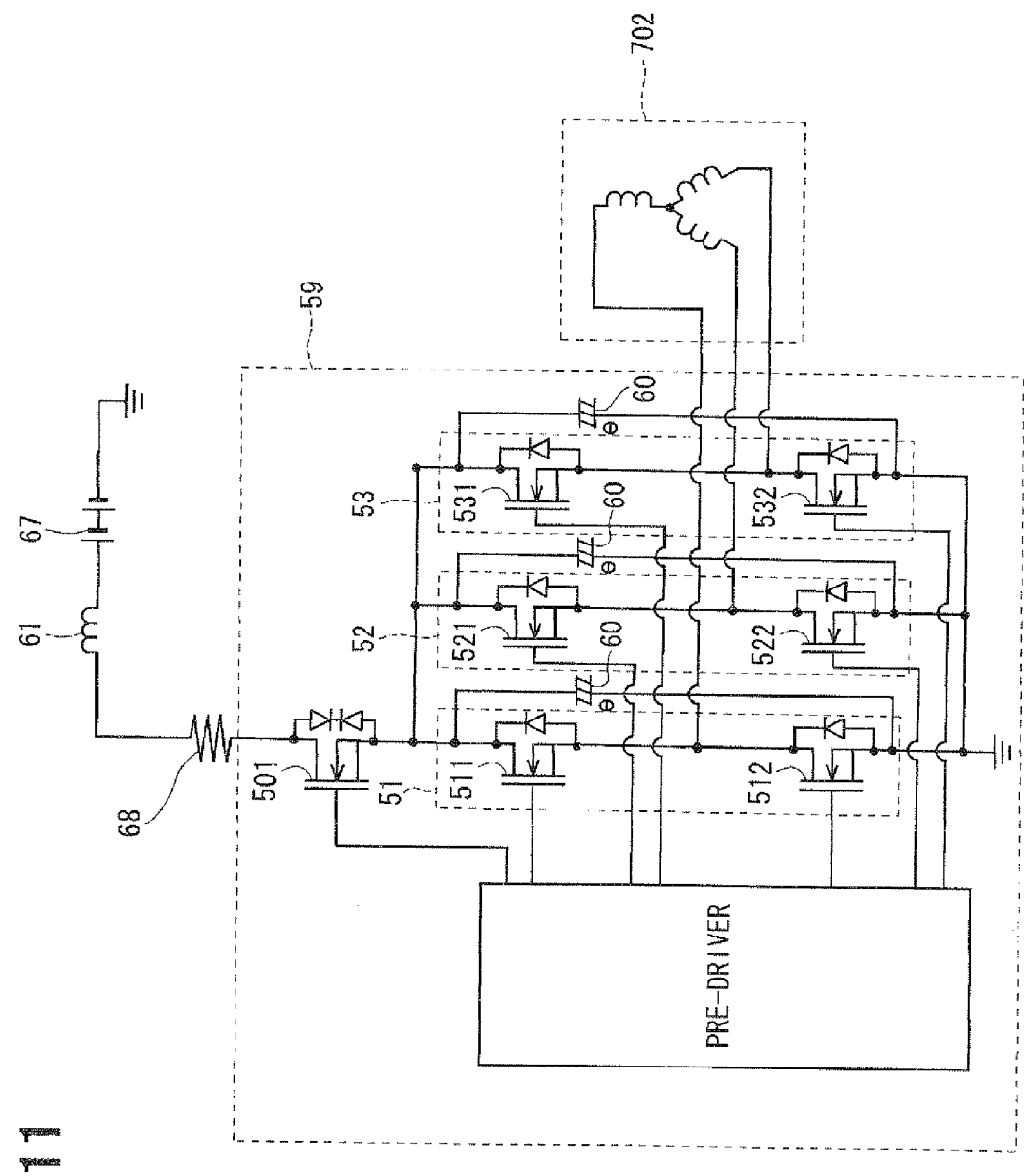
FIG. 11 is a circuit diagram of an inverter circuit of a motor according to a third embodiment of the present invention.

As shown in FIG. 11, according to the third embodiment, the windings of the stator 20 are connected in a Y configuration to form a three-phase winding set 702. The three-phase winding set 702 is connected to the first inverter circuit 59.

Figure 12:
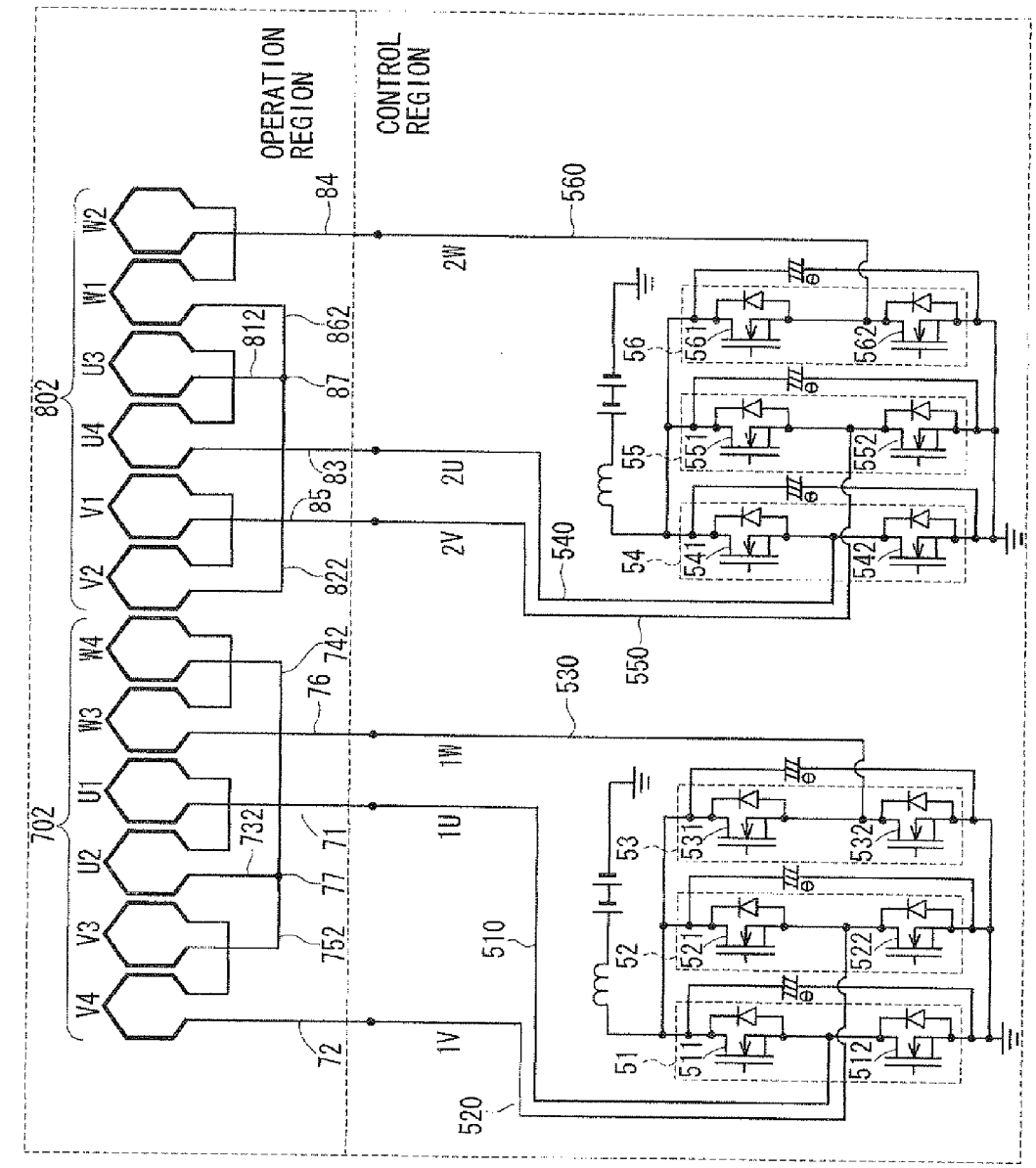
FIG. 12 is a circuit diagram of the motor according to the third embodiment.
Figure 13:
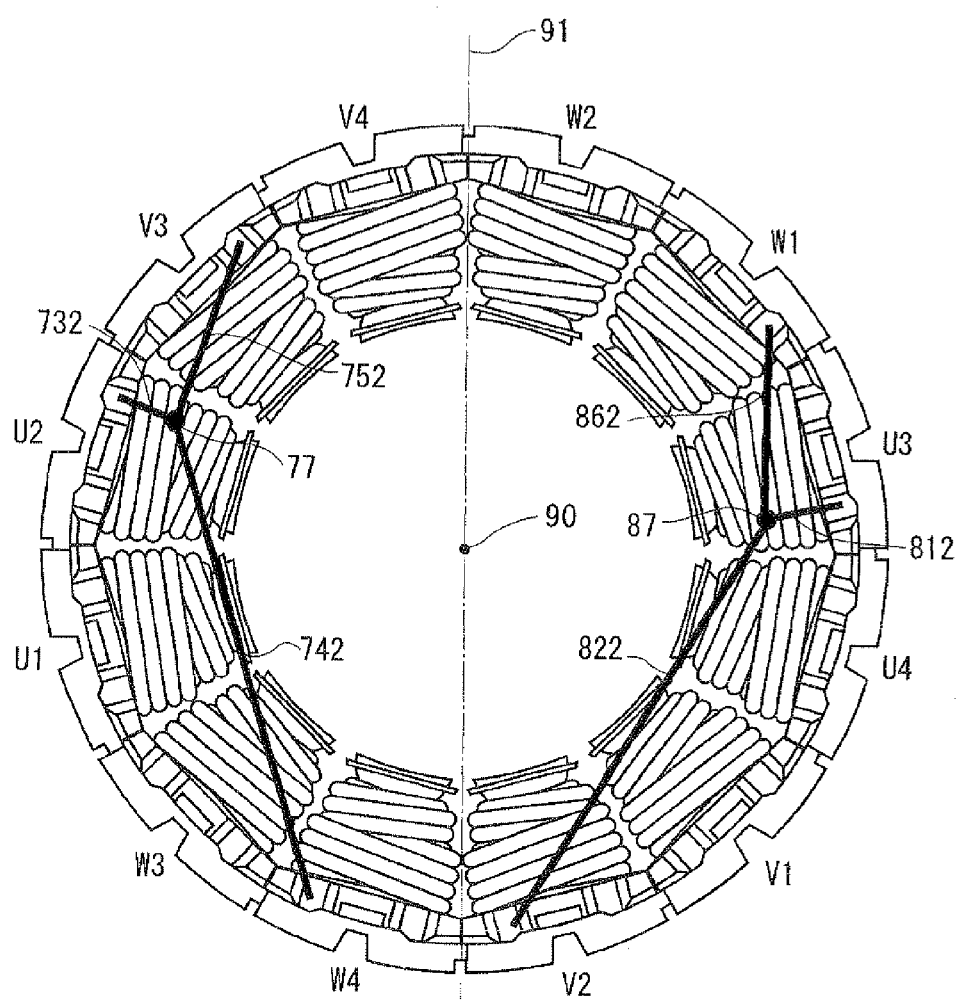
FIG. 13 is a diagram illustrating a plan view of a stator of the motor according to the third embodiment.

Further, as shown in FIGS. 12, 13, the windings of the stator 20 are connected in a Y configuration to form a three-phase winding set 802. The three-phase winding set 802 is connected to the second inverter circuit independent of the first inverter circuit 59.

The pair of the windings V4, V3, the pair of the windings U2, U1, and the pair of the windings W3, W4 of the three-phase winding set 702 are arranged adjacent in the rotation direction of the rotor 30. Likewise, the pair of the windings V2, V1, the pair of the windings U4, U3, and the pair of the windings W1, W2 of the three-phase winding set 802 are arranged adjacent in the rotation direction of the rotor 30. The three-phase winding sets 702, 802 are arranged adjacent to each other in the rotation direction of the rotor 30 so that the three-phase winding sets 702, 802 can be located opposite to each other with respect to the imaginary plane 91 including the rotation axis 90 of the rotor 30. Further, the same phase windings of the three-phase winding sets 702, 802 are symmetrically arranged with respect to the rotation axis 90.

Next, a method for connecting the windings of each three-phase winding set to the drive modules of a corresponding inverter circuit is described below with reference to FIG. 12.

In the three-phase winding set 702, a lead 72 of the winding V4 corresponding to the first V-phase extends in the axial direction to cross over from the operation region to the control region and is connected to the common terminal 520 of the power supply side switching element 521 and the ground side switching element 522 of the power module 52 corresponding to the first V-phase.

A lead 71 of the winding U1 corresponding to the first U-phase extends in the axial direction to cross over from the operation region to the control region and is connected to the common terminal 510 of the power supply side switching element 511 and the ground side switching element 512 of the power module 51 corresponding to the first U-phase.

A lead 76 of the winding W3 corresponding to the first W-phase extends in the axial direction to cross over from the operation region to the control region and is connected to the common terminal 530 of the power supply side switching element 531 and the ground side switching element 532 of the power module 53 corresponding to the first W-phase.

A lead 752 of the winding V3 corresponding to the first V-phase, a lead 732 of the winding U2 corresponding to the first U-phase, and a lead 742 of the winding W4 corresponding to the first W-phase are connected together at a neutral point 77. Thus, the leads 752, 732, 742 serve as a jumping wire for electrically connecting the windings.

In the three-phase winding set 802, a lead 85 of the winding V1 corresponding to the second V-phase extends in the axial direction to cross over from the operation region to the control region and is connected to the common terminal 550 of the power supply side switching element 551 and the ground side switching element 552 of the power module 55 corresponding to the second V-phase.

A lead 83 of the winding U4 corresponding to the second U-phase extends in the axial direction to cross over from the operation region to the control region and is connected to the common terminal 540 of the power supply side switching element 541 and the ground side switching element 542 of the power module 54 corresponding to the second U-phase.

A lead 84 of the winding W2 corresponding to the second W-phase extends in the axial direction to cross over from the operation region to the control region and is connected to the common terminal 560 of the power supply side switching element 561 and the ground side switching element 562 of the power module 56 corresponding to the second W-phase.

A lead 822 of the winding V2 corresponding to the second V-phase, a lead 812 of the winding U3 corresponding to the second U-phase, and a lead 862 of the winding W1 corresponding to the second W-phase are connected together at a neutral point 87. Thus, the leads 822, 812, 862 serve as a jumping wire for electrically connecting the windings.

As described above, according to the third embodiment, the leads 71, 72, 76 of the three-phase winding set 702 and the leads 83-85 of the three-phase winding set 802 extend in the axial direction to cross over from the operation region to the control region and are directly connected to the common terminals 510, 520, 530, 540, 550, 560 of the power supply side switching elements and the ground side switching elements of the power modules 51-56. In such an approach, the number of connection points between the winding and the switching element is reduced so that wiring of the three-phase winding sets 702, 802 to the power modules 51-56 can be simplified.

Further, according to the third embodiment, the jumping wires 752, 732, 741 of the three-phase winding set 702 and the jumping wires 822, 812, 862 of the three-phase winding set 802 are connected together not to overlap in the axial direction within the operation region. Therefore, the three-phase winding sets 702, 802 are connected to the power modules 51-56 in a simple manner without busbars for causing the leads to extend in the circumferential direction and also without a holder for holding the busbars. Accordingly, the size of the motor 10 in the axial direction can be reduced.

Furthermore, according to the third embodiment, the same phase winding of the three-phase winding sets 702, 802 are symmetrically arranged with respect to the rotation axis 90 and energized at the same time so as to generate attracting force at the same time. Thus, uneven distribution of a gap between the stator 20 and the rotor 30 is reduced. Accordingly, eccentricity of the rotor 30 is reduced so that a torque ripple can be reduced.

Even in a case where energization of one control system is stopped, the rotor 30 can rotate both in forward and reverse directions by the rotating magnetic filed generated by the three-phase winding set 702 or the three-phase winding set 803.

Fourth Embodiment

A fourth embodiment of the present invention is described below with reference to FIGS. 14, 15. A difference of the fourth embodiment from the preceding embodiments is as follows.

Figure 14:
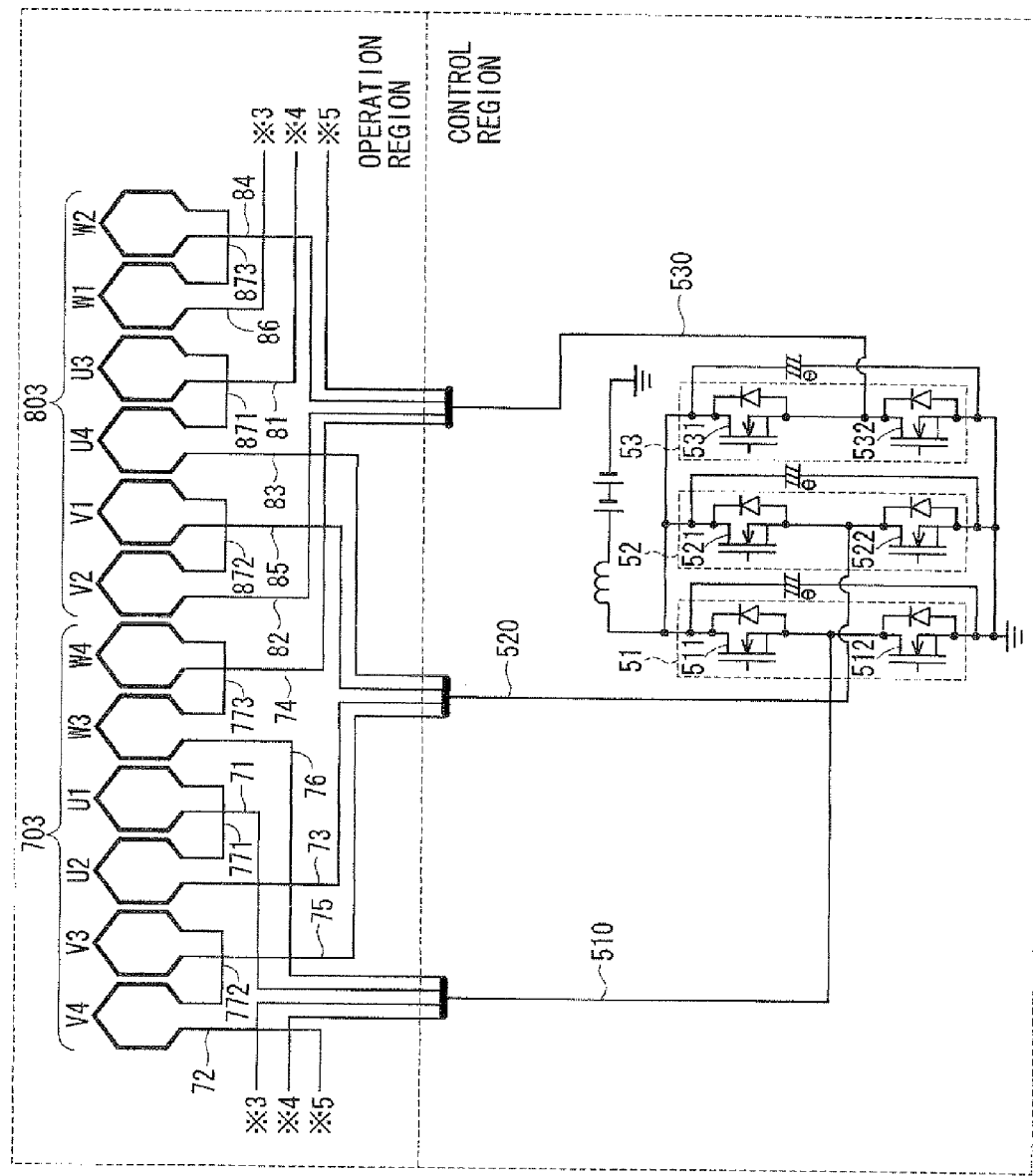
FIG. 14 is a circuit diagram of a motor according to a fourth embodiment of the present invention.
Figure 15:
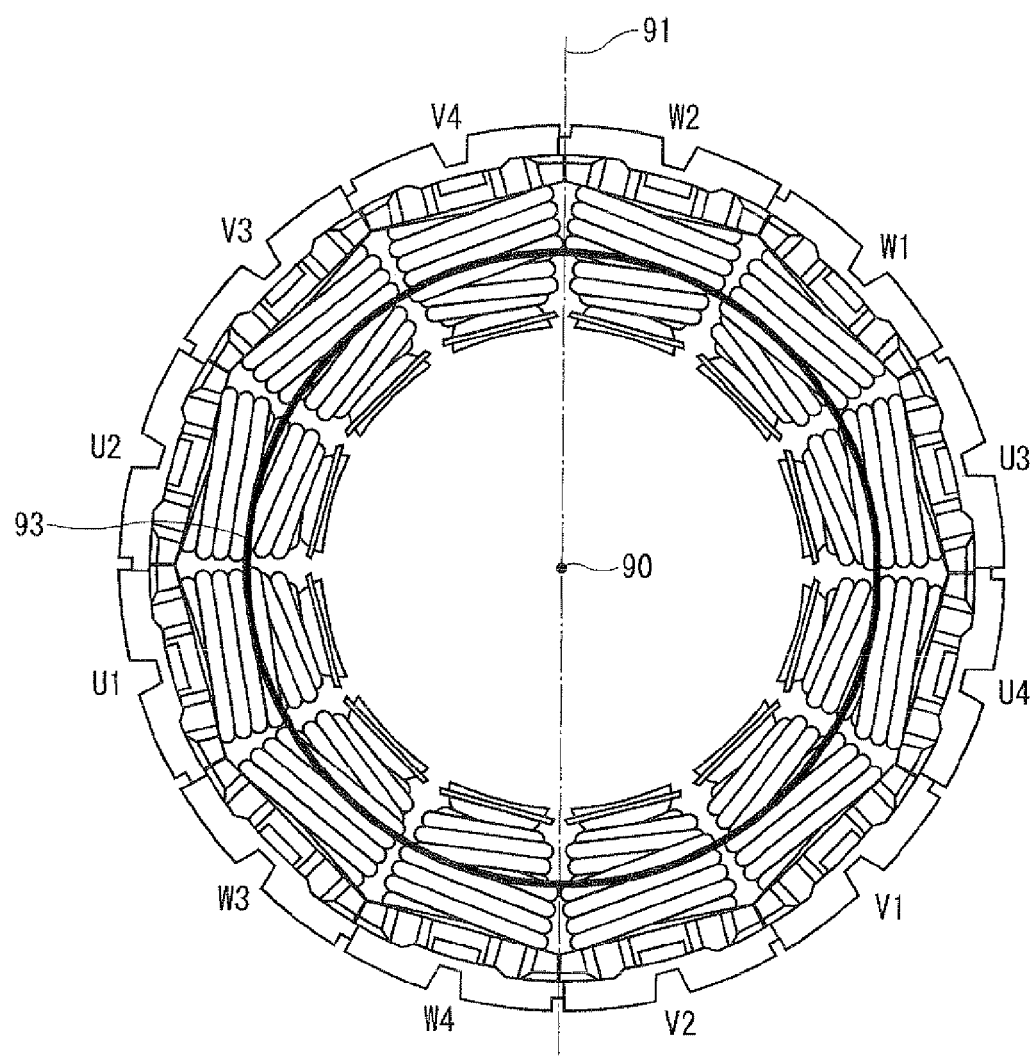
FIG. 15 is a diagram illustrating a plan view of a stator of the motor according to the fourth embodiment.

As shown in FIGS. 14, 15, according to the fourth embodiment, adjacent windings of the three-phase winding sets 703, 803 are electrically connected together. Thus, as indicated by a solid line 93 in FIG. 15, the three-phase winding sets 703, 803 are wired by one control system.

A lead 75 of the winding V3 and a lead 73 of the winding U2 of the three-phase winding set 703 approach a lead 85 of the winding V1 and a lead 83 of the winding U4 of the three-phase winding set 803 at a position, for example, between the windings W3, W4. The four leads 75, 73, 85, 83 extend parallel to each other in the axial direction from the position between the windings W3, W4 to cross over from the operation region to the control region and are directly connected to the common terminal 520 of the power supply side switching element 521 and the ground side switching element 522 of the power module 52 corresponding to a V-phase.

A lead 71 of the winding U1 and a lead 76 of the winding W3 of the three-phase winding set 703 approach a lead 81 of the winding U3 and a lead 86 of the winding W1 of the three-phase winding set 803 at a position, for example, between the windings V4, V3. The four leads 71, 76, 81, 86 extend parallel to each other in the axial direction from the position between the windings V4, V3 to cross over from the operation region to the control region and are directly connected to the common terminal 510 of the power supply side switching element 511 and the ground side switching element 512 of the power module 51 corresponding to a U-phase.

A lead 74 of the winding W4 and a lead 72 of the winding V4 of the three-phase winding set 703 approach a lead 82 of the winding V2 and a lead 84 of the winding W2 of the three-phase winding set 803 at a position, for example, between the windings U4, U3. The four leads 74, 72, 82, 84 extend parallel to each other in the axial direction from the position between the windings U4, U3 to cross over from the operation region to the control region and are directly connected to the common terminal 530 of the power supply side switching element 531 and the ground side switching element 532 of the power module 53 corresponding to a W-phase.

According to the fourth embodiment, the length of wire for connecting the windings that are arranged in the circumferential direction can be minimized. Further, all the windings of the three-phase winding sets 70, 80 can be formed by winding a single coil wire 24 around the twelve stator poles. Therefore, a process of forming the windings can be simplified.

Further, according to the fourth embodiment, the leads 71-76 of the three-phase winding set 703 and the leads 81-86 of the three-phase winding set 803 extend in the axial direction to cross over from the operation region to the control region and are directly connected to the common terminals 510, 520, 530 of the power supply side switching elements and the ground side switching elements of the power modules 51-53. In such an approach, the number of connection points between the winding and the switching element is reduced so that wiring of the three-phase winding sets 703, 803 to the power modules 51-53 can be simplified.

Furthermore, according to the fourth embodiment, the same phase windings of the three-phase winding sets 703, 803 are symmetrically arranged with respect to the rotation axis 90 and energized at the same time so as to generate attracting force at the same time. Thus, uneven distribution of a gap between the stator 20 and the rotor 30 is reduced. Accordingly, eccentricity of the rotor 30 is reduced so that a torque ripple can be reduced.

Furthermore, according to the fourth embodiment, the leads 71-76, 81-86 of the three-phase winding sets 703, 803 extend straightly within an area defined by the stator poles of the stator 20 in the radial direction to approach each other and are connected to the common terminals 510, 520, 530 of the power modules 51-53. Therefore, the three-phase winding sets 703, 803 are connected to the power modules 51-53 in a simple manner without busbars for causing the leads to extend in the circumferential direction and also without a holder for holding the busbars. Accordingly, the size of the motor 10 in the axial direction can be reduced.

Fifth Embodiment

A fifth embodiment of the present invention is described below with reference to FIG. 16. A difference of the fifth embodiment from the preceding embodiments is as follows.

Figure 16:
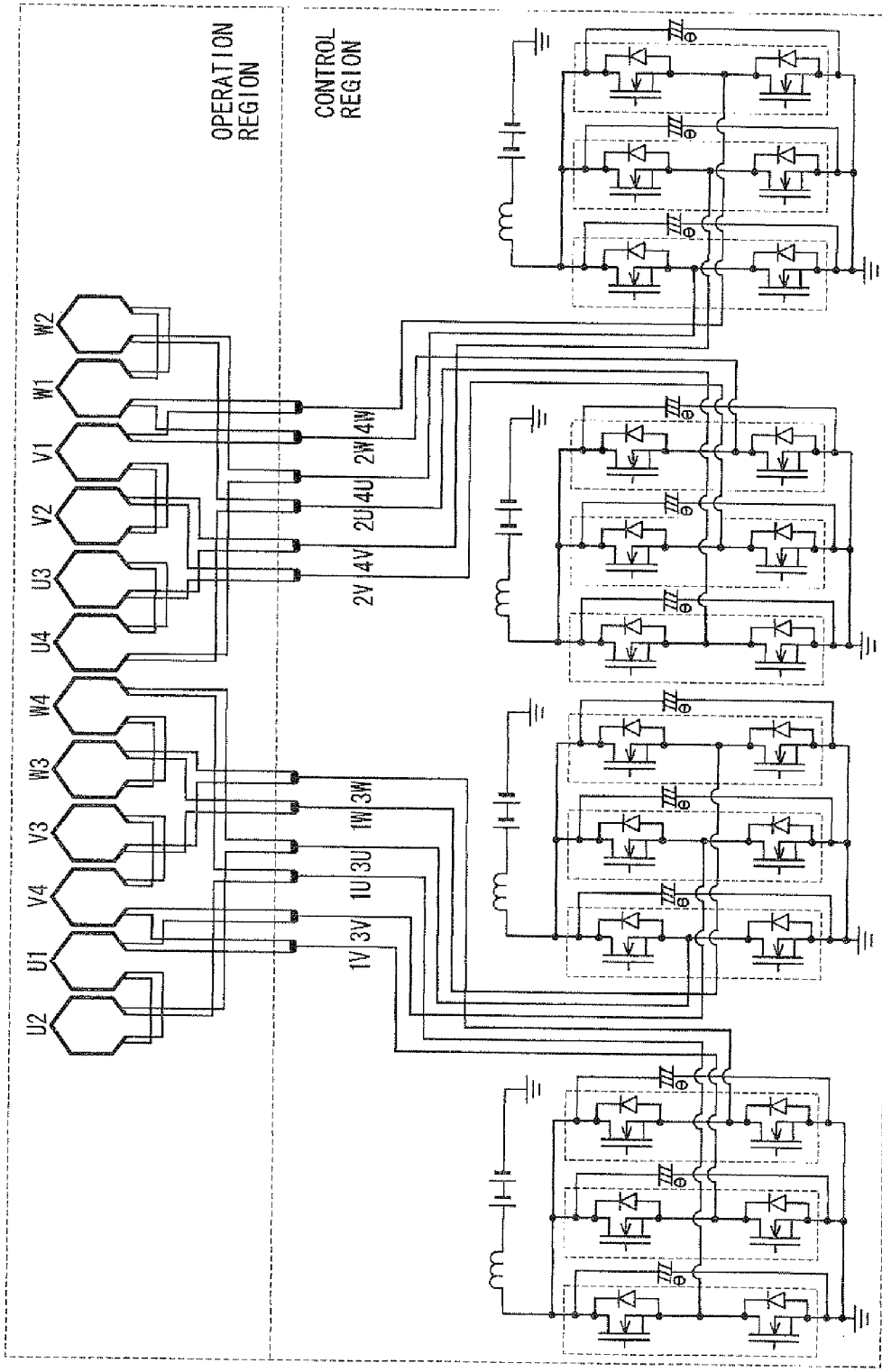
FIG. 16 is a circuit diagram of a motor according to a fifth embodiment of the present invention.

As shown in FIG. 16, according to the fifth embodiment, a coil wire is doubly wound around each of the twelve stator poles of the stator 20 to form four three-phase winding sets. It is noted that the cross sectional area of the double-coil wire is substantially equal to the cross sectional area of the coil wire 24 of the first embodiment.

In each of the four three-phase winding sets, a lead of a winding corresponding to one phase and a lead of a winding corresponding to another phase approach each other at a position within the operation region, extend parallel to each other in the axial direction from the position to cross over from the operation region to the control region, and are directly connected to a common terminal of a power supply side switching element and a ground side switching element of a corresponding inverter circuit. In such an approach, the number of connection points between the winding and the switching element is reduced so that wiring of the three-phase winding sets to power modules of inverter circuits can be simplified.

As described above, according to the fifth embodiment, four three-phase winding sets are energized and controlled by four independent inverter circuits. Thus, the fail-safe feature can be improved.

Further, according to the fifth embodiment, the cross sectional area of the double-coil wire is substantially equal to the cross sectional area of the coil wire 24 of the first embodiment. In other words, the cross sectional area of each coil wire of the double-coil wire is substantially half of the cross sectional area of the coil wire 24 of the first embodiment. Accordingly, modulus of elasticity of each coil wire of the double-coil wire is small so that each coil wire of the double-coil wire can be easily wound around the stator poles of the stator 20.

Sixth Embodiment

Figure 17:
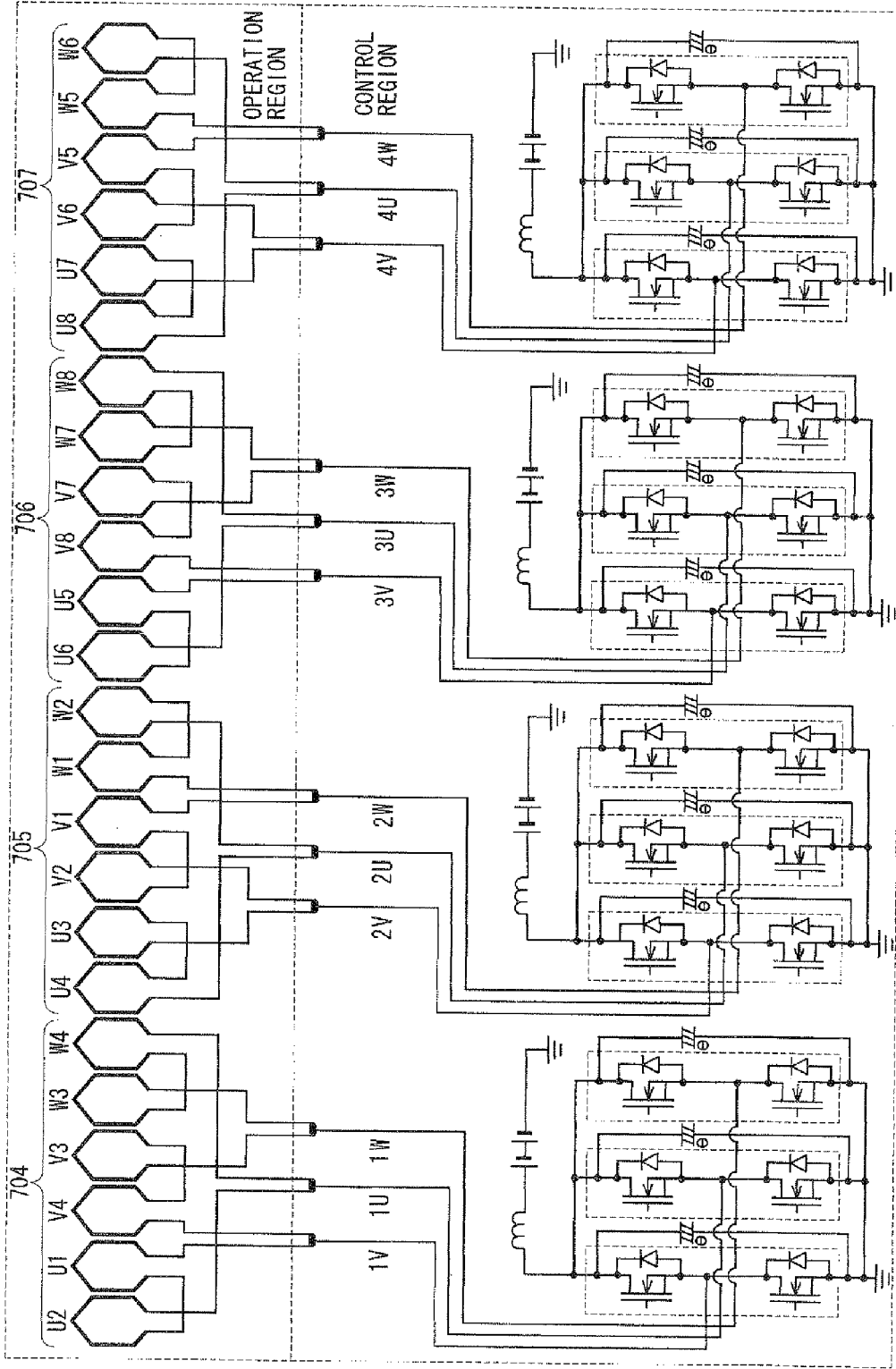
FIG. 17 is a circuit diagram of a motor according to a sixth embodiment of the present invention.

A sixth embodiment of the present invention is described below with reference to FIG. 17. A difference of the sixth embodiment from the preceding embodiments is as follows.

According to the sixth embodiment, the stator 20 has twenty-four stator poles, and a coil wire is wound around each of the twenty-four stator poles to form twenty-four windings U1-U8, V1-V8, and W1-W8. The twenty-four windings U1-U8, V1-V8, and W1-W8 form four three-phase winding sets 704-707. The four three-phase winding sets 704-707 are energized and controlled by four independent inverter circuits.

Like the fifth embodiment, in each of the four three-phase winding sets 704-707, a lead of a winding corresponding to one phase and a lead of a winding corresponding to another phase approach each other at a position within the operation region, extend parallel to each other in the axial direction from the position to cross over from the operation region to the control region, and are directly connected to a common terminal of a power supply side switching element and a ground side switching element of a corresponding inverter circuit. In such an approach, the number of connection points between the winding and the switching element is reduced so that wiring of the three-phase winding sets 704-707 to power modules of the inverter circuits can be simplified.

As described above, according to the sixth embodiment, the four three-phase winding sets 704-707 are energized and controlled by four independent inverter circuits so that the fail-safe feature can be improved.

Further, according to the sixth embodiment, the number of the stator poles of the stator 20 is adjusted according to the number of the rotor poles of the rotor 30 so that a cogging torque can be reduced.

Seventh Embodiment

Figure 18:
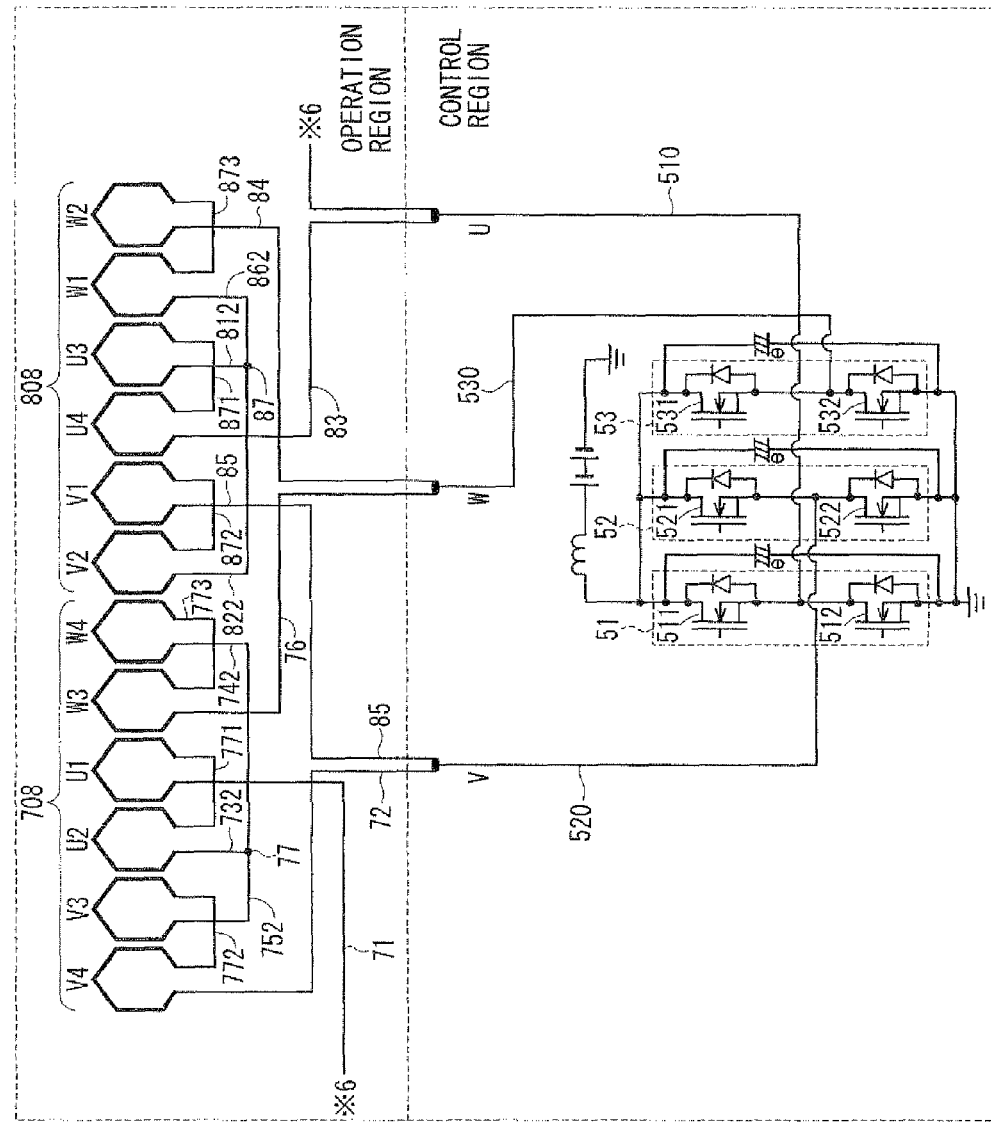
FIG. 18 is a circuit diagram of a motor according to a seventh embodiment of the present invention.

A seventh embodiment of the present invention is described below with reference to FIG. 18. A difference of the seventh embodiment from the preceding embodiments is as follows.

According to the seventh embodiment, the windings of the stator 20 are connected in a Y configuration to form two three-phase winding sets 708, 808. The three-phase winding sets 708, 808 are connected to a common inverter circuit constructed with power modules 51-53.

A lead 72 of the winding V4 of the three-phase winding set 708 and a lead 85 of the winding V1 of the three-phase winding set 808 approach each other at a position corresponding to the winding U1, for example. The leads 72, 85 extend parallel to each other from the position corresponding to the winding U1 to cross over from the operation region to the control region and are directly connected to the common terminal 520 of the power supply side switching element 521 and the ground side switching element 522 of the power module 52 corresponding to a V-phase.

A lead 76 of the winding W3 of the three-phase winding set 708 and a lead 84 of the winding W2 of the three-phase winding set 808 approach each other at a position corresponding to the winding V1, for example. The leads 76, 84 extend parallel to each other from the position corresponding to the winding V1 to cross over from the operation region to the control region and are directly connected to the common terminal 530 of the power supply side switching element 531 and the ground side switching element 532 of the power module 53 corresponding to a W-phase.

A lead 71 of the winding U1 of the three-phase winding set 708 and a lead 83 of the winding U4 of the three-phase winding set 808 approach each other at a position corresponding to the winding W1, for example. The leads 71, 83 extend parallel to each other from the position corresponding to the winding W1 to cross over from the operation region to the control region and are directly connected to the common terminal 510 of the power supply side switching element 511 and the ground side switching element 512 of the power module 51 corresponding to a U-phase.

In the three-phase winding set 708, a lead 752 of the winding V3, a lead 732 of the winding U2, and a lead 742 of the winding W4 are connected together at a neutral point 77. Thus, the leads 752, 732, 742 serve as a jumping wire for electrically connecting the windings.

In the three-phase winding set 808, a lead 822 of the winding V2, a lead 812 of the winding U3, and a lead 862 of the winding W1 are connected together at a neutral point 87. Thus, the leads 822, 812, 862 serve as a jumping wire for electrically connecting the windings.

As described above, according to the seventh embodiment, the leads 72, 76, 71 of the three-phase winding set 708 and the leads 85, 84, 83 of the three-phase winding set 808 approach each other within the operation region, then extend in the axial direction to cross over from the operation region to the control region, and are directly connected to the common terminals 510, 520, 530 of the power supply side switching elements and the ground side switching elements of the power modules 51-53. In such an approach, the number of connection points between the winding and the switching element is reduced so that wiring of the three-phase winding sets 708, 808 to the power modules 51-53 can be simplified.

Further, according to the seventh embodiment, the same phase windings of the three-phase winding sets 708, 808 are symmetrically arranged with respect to the rotation axis 90 and energized at the same time so as to generate attracting force at the same time. Thus, uneven distribution of a gap between the stator 20 and the rotor 30 is reduced. Accordingly, eccentricity of the rotor 30 is reduced so that a torque ripple can be reduced.

Eighth Embodiment

An eighth embodiment of the present invention is described below with reference to FIG. 19. A difference of the eighth embodiment from the preceding embodiments is as follows.

Figure 19:
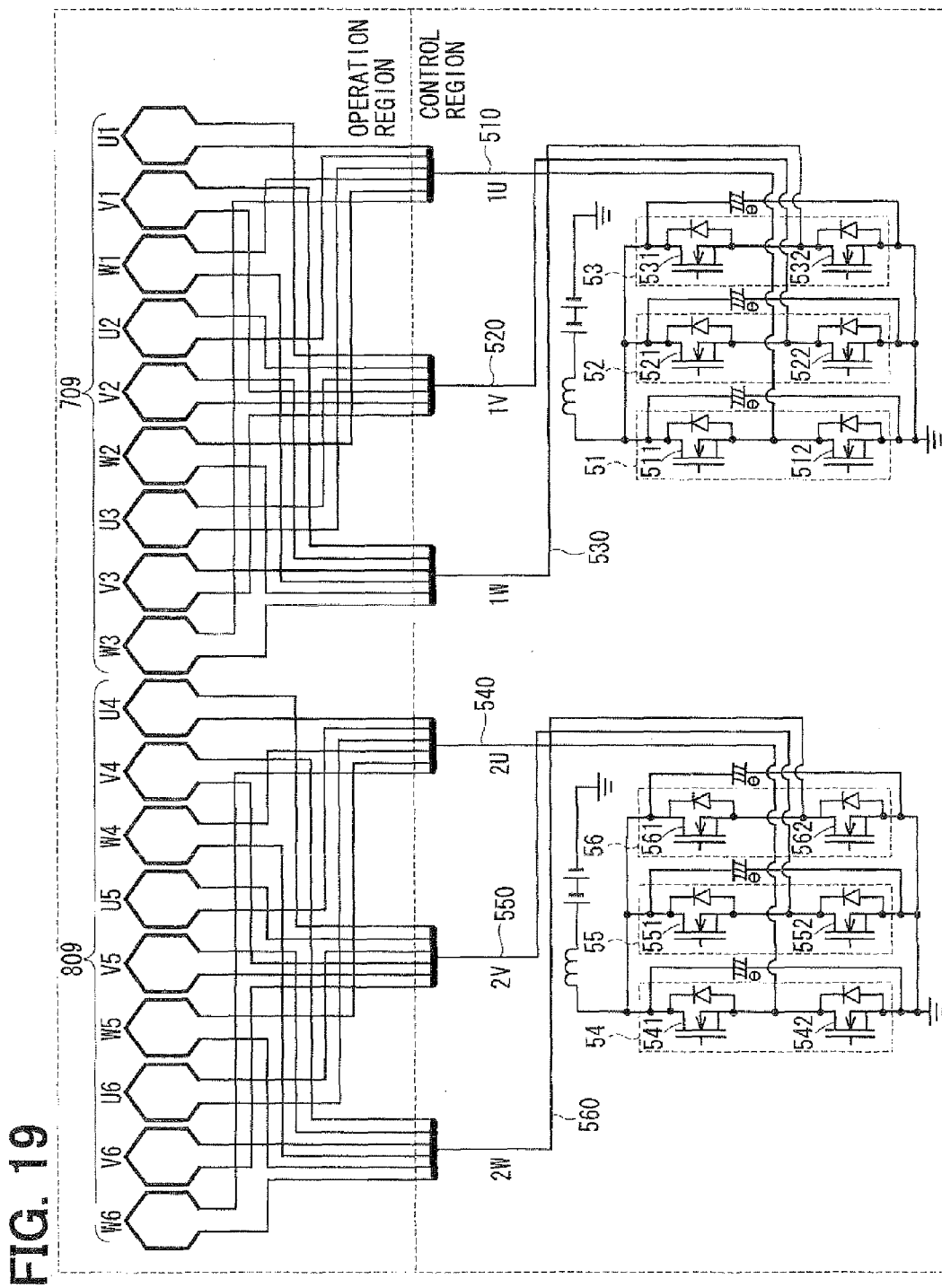
FIG. 19 is a circuit diagram of a motor according to an eighth embodiment of the present invention.

As shown in FIG. 19, according to the eighth embodiment, the stator 20 has eighteen stator poles, and a coil wire is wound around each of the eighteen stator poles to form eighteen windings U1-U6, V1-V6, and W1-W6. The eighteen windings U1-U6, V1-V6, and W1-W6 form two three-phase winding sets 709, 809. The two three-phase winding sets 709, 809 are energized and controlled by two independent inverter circuits.

In the three-phase winding set 709, a first lead of the winding U1, a first lead of the winding U2, a first lead of the winding U3, a first lead of the winding W1, a first lead of the winding W2, and a first lead of the winding W3 approach each other at a first position within the operation region. These six leads extend parallel to each other in the axial direction from the first position to cross over from the operation region to the control region and are directly connected to the common terminal 510 of the power supply side switching element 511 and the ground side switching element 512 of the power module 51 corresponding to the first U-phase.

A second lead of the winding U1, a second lead of the winding U2, a second lead of the winding U3, a first lead of the winding V1, a first lead of the winding V2, and a first lead of the winding V3 approach each other at a second position within the operation region. These six leads extend parallel to each other in the axial direction from the second position to cross over from the operation region to the control region and are directly connected to the common terminal 520 of the power supply side switching element 521 and the ground side switching element 522 of the power module 52 corresponding to the first V-phase.

A second lead of the winding V1, a second lead of the winding V2, a second lead of the winding V3, a second lead of the winding W1, a second lead of the winding W2, and a second lead of the winding W3 approach each other at a third position within the operation region. These six leads extend parallel to each other in the axial direction from the third position to cross over from the operation region to the control region and are directly connected to the common terminal 530 of the power supply side switching element 531 and the ground side switching element 532 of the power module 53 corresponding to the first W-phase.

In the three-phase winding set 809, a first lead of the winding U4, a first lead of the winding U5, a first lead of the winding U6, a first lead of the winding W4, a first lead of the winding W5, and a first lead of the winding W6 approach each other at a fourth position within the operation region. These six leads extend parallel to each other in the axial direction from the fourth position to cross over from the operation region to the control region and are directly connected to the common terminal 540 of the power supply side switching element 541 and the ground side switching element 542 of the power module 54 corresponding to the second U-phase.

A second lead of the winding U4, a second lead of the winding U5, a second lead of the winding U6, a first lead of the winding V4, a first lead of the winding V5, and a first lead of the winding V6 approach each other at a fifth position within the operation region. These six leads extend parallel to each other in the axial direction from the fifth position to cross over from the operation region to the control region and are directly connected to the common terminal 550 of the power supply side switching element 551 and the ground side switching element 552 of the power module 55 corresponding to the second V-phase.

A second lead of the winding V4, a second lead of the winding V5, a second lead of the winding V6, a second lead of the winding W4, a second lead of the winding W5, and a second lead of the winding W6 approach each other at a sixth position within the operation region. These six leads extend parallel to each other in the axial direction from the sixth position to cross over from the operation region to the control region and are directly connected to the common terminal 560 of the power supply side switching element 561 and the ground side switching element 562 of the power module 56 corresponding to the second W-phase.

As described above, according to the eighth embodiment, the leads of the three-phase winding sets 709, 809 approach each other within the operation region, extend in the axial direction to cross over from the operation region to the control region, and are directly connected to the common terminals 510, 520, 530, 540, 550, 560 of the power supply side switching elements and the ground side switching elements of the power modules 51-56. In such an approach, the number of connection points between the winding and the switching element is reduced so that wiring of the three-phase winding sets 709, 809 to the power modules 51-56 can be simplified.

Further, according to the eighth embodiment, the same phase windings of the three-phase winding sets 709, 809 are symmetrically arranged with respect to the rotation axis 90 and energized at the same time so as to generate attracting force at the same time. Thus, uneven distribution of a gap between the stator 20 and the rotor 30 is reduced. Accordingly, eccentricity of the rotor 30 is reduced so that a torque ripple can be reduced.

Further, even in a case where energization of one control system is stopped, the rotor 30 can rotate both in forward and reverse directions by the rotating magnetic filed generated by the three-phase winding set 709 or the three-phase winding set 809.

Ninth Embodiment

Figure 20:
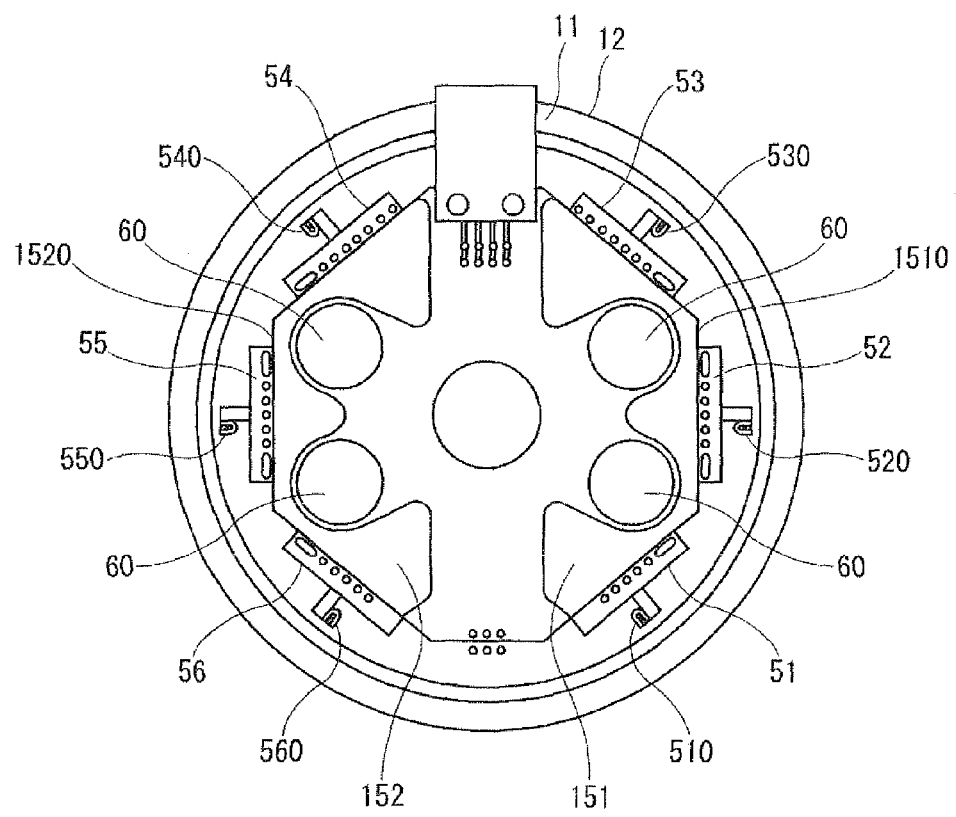
FIG. 20 is a diagram illustrating a plan view of a control region of a motor according to a ninth embodiment of the present invention.

A ninth embodiment of the present invention is described below with reference to FIG. 20. FIG. 20 is a plan view of a control region of a motor according to a ninth embodiment. It is noted that the components such as the choke coil 61 and the circuit board 62 shown in FIG. 1 are omitted in FIG. 20 for the sake of clarity.

As shown in FIG. 20, the power modules 51-56 are fixed (e.g., bonded) to outer walls 1510, 1520 of heatsinks 151, 152 in the radial direction. Therefore, the leads of the windings are connected to the power modules 51-56 outside the heatsinks 151, 152 so that the leads of the windings can be easily connected to the power modules 51-56. Further, the heatsinks 151, 152 are not coaxial with the tube portion 12 of the housing 11. Therefore, it is less likely that the heatsinks 151, 152 are affected by heat of the stator 20. Accordingly, heat radiation performance can be improved.

Tenth Embodiment

Figure 21:
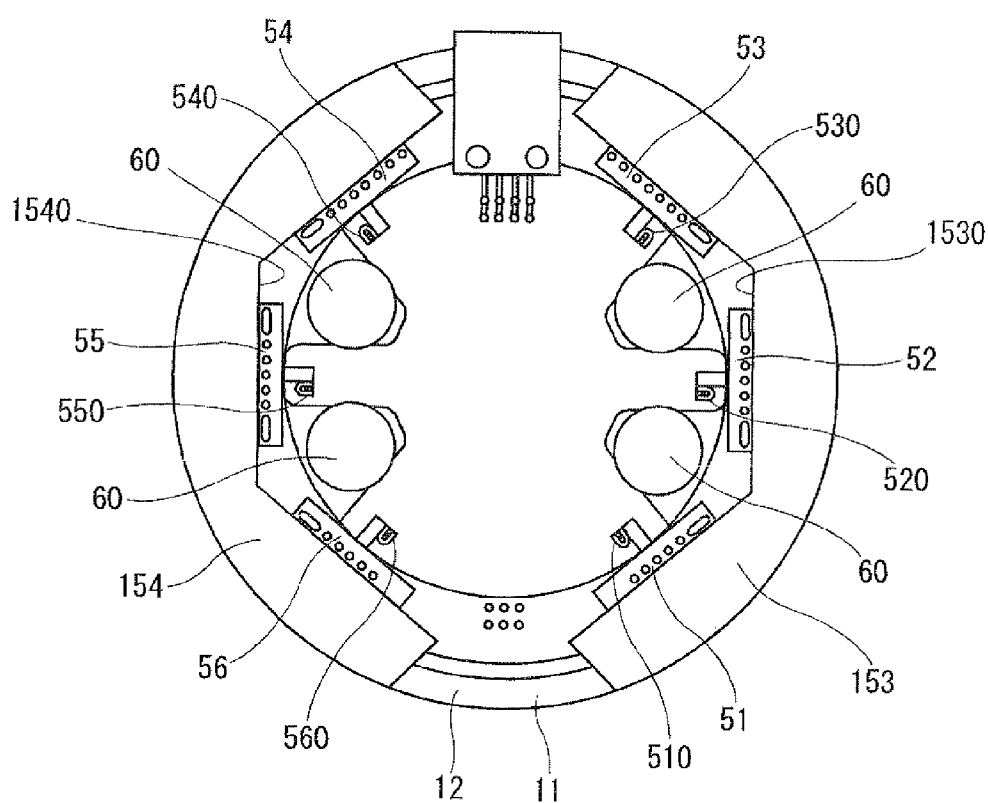
FIG. 21 is a diagram illustrating a plan view of a control region of a motor according to a tenth embodiment of the present invention.

A tenth embodiment of the present invention is described below with reference to FIG. 21. FIG. 21 is a plan view of a control region of a motor according to the tenth embodiment. It is noted that the components such as the choke coil 61 and the circuit board 62 shown in FIG. 1 are omitted in FIG. 21 for the sake of clarity.

As shown in FIG. 21, the power modules 51-56 are fixed (e.g., bonded) to inner walls 1530, 1540 of heatsinks 153, 154 in the radial direction. In such an approach, heat capacities and heat radiation areas of the heatsinks 153, 154 can be greater than heat capacities and heat radiation areas of the heatsinks 151, 152 of the ninth embodiment. The increase in the heat radiation areas of the heatsinks 153, 154 result in an increase in the areas of the inner walls 1530, 1540 in the radial direction. That is, when the heat radiation areas of the heatsinks 153, 154 are increased, spaces for the power modules 51-56 are increased. Therefore, for example, the number of devices mounted on the power modules 51-56 can be increased so that flexibility of design of the power modules 51-56 can be improved.

Eleventh Embodiment

Figure 22:
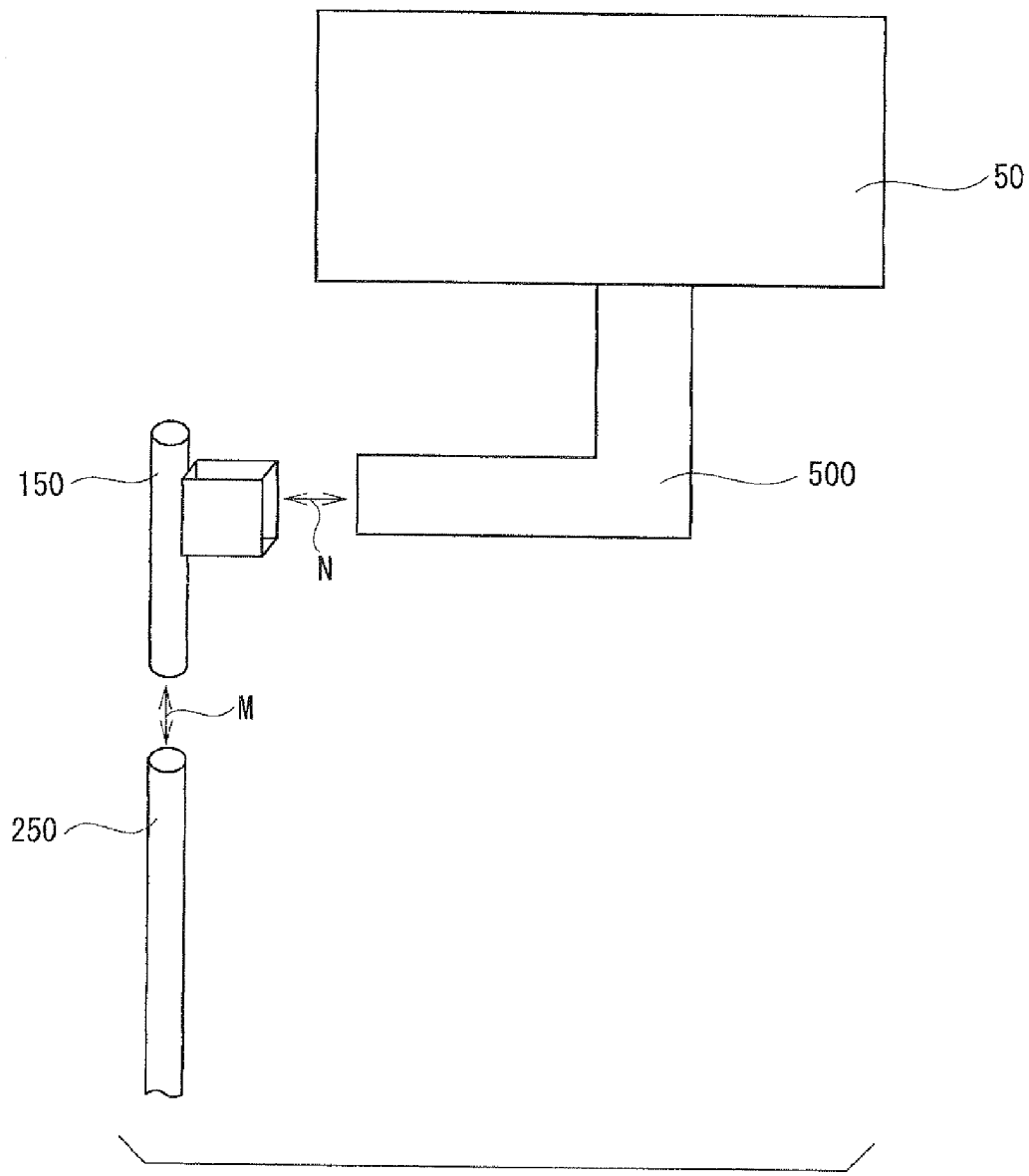
FIG. 22 is a diagram illustrating a method of connecting a lead of a winding to a common terminal of a power module of a motor according to an eleventh embodiment of the present invention.

An eleventh embodiment of the present invention is described below with reference to FIG. 22. FIG. 22 depicts a method of connecting the lead of the winding to the common terminal of the power module. As shown in FIG. 22, a lead 250 is connected to a connector 150 as indicated by an arrow M, and a common terminal 500 is connected to the connector 150 as indicated by an arrow N. In this way, the lead 250 is connected to the common terminal 500 through the connector 150. Thus, wiring of the lead 250 to the power module 50 can be simplified.

Figure 23A:
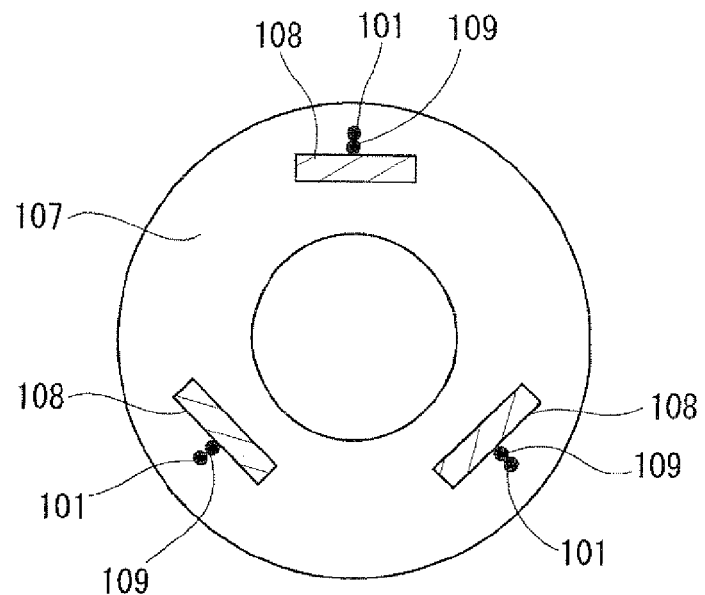
FIG. 23A is a simplified diagram illustrating a cross-sectional view taken along the line XXIIIA-XXIIIA in FIG. 23B.
Figure 23B:
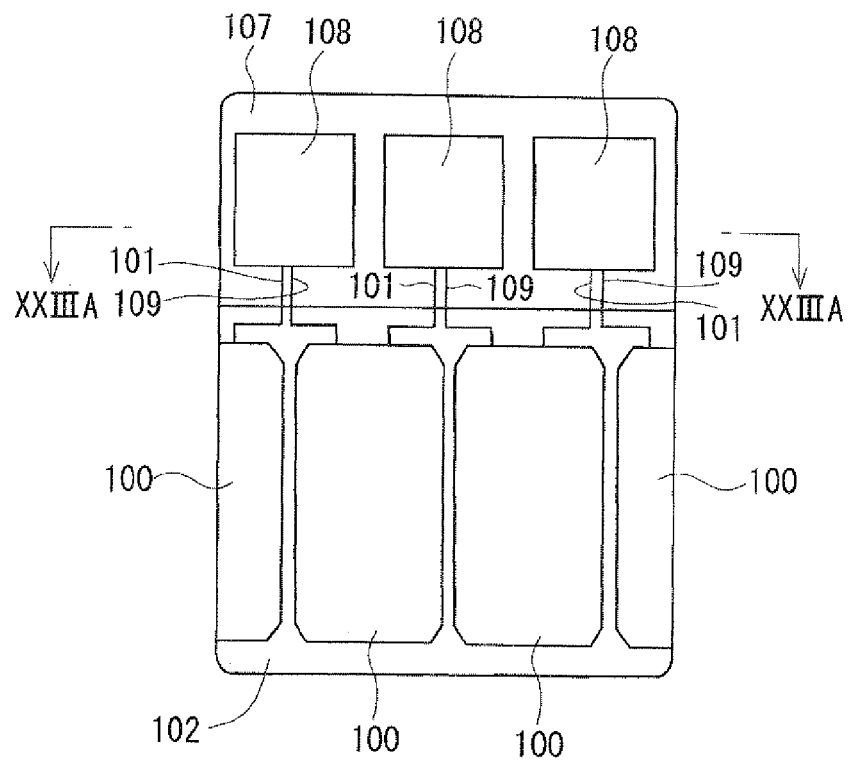
FIG. 23B is a simplified diagram illustrating a vertical cross-sectional view of a motor according to the present invention.
Figure 24A:
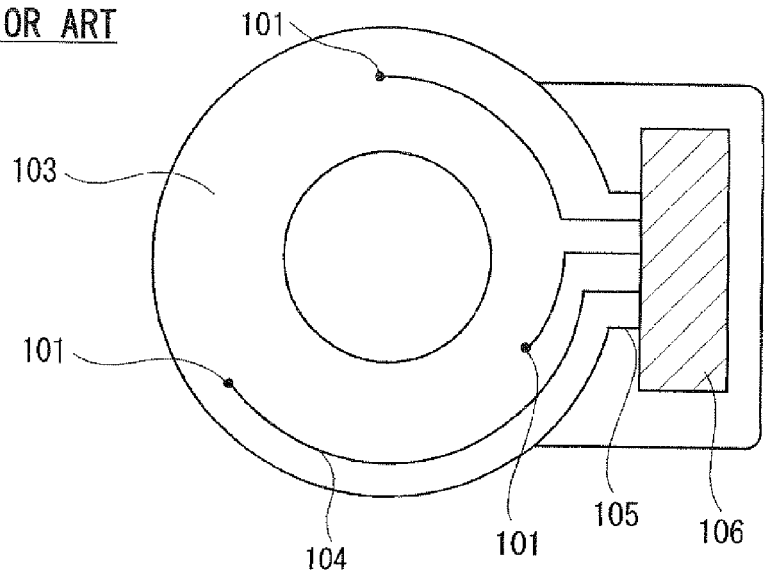
FIG. 24A is a simplified diagram illustrating a cross-sectional view taken along the line XXIVA-XXIVA in FIG. 24B.
Figure 24B:
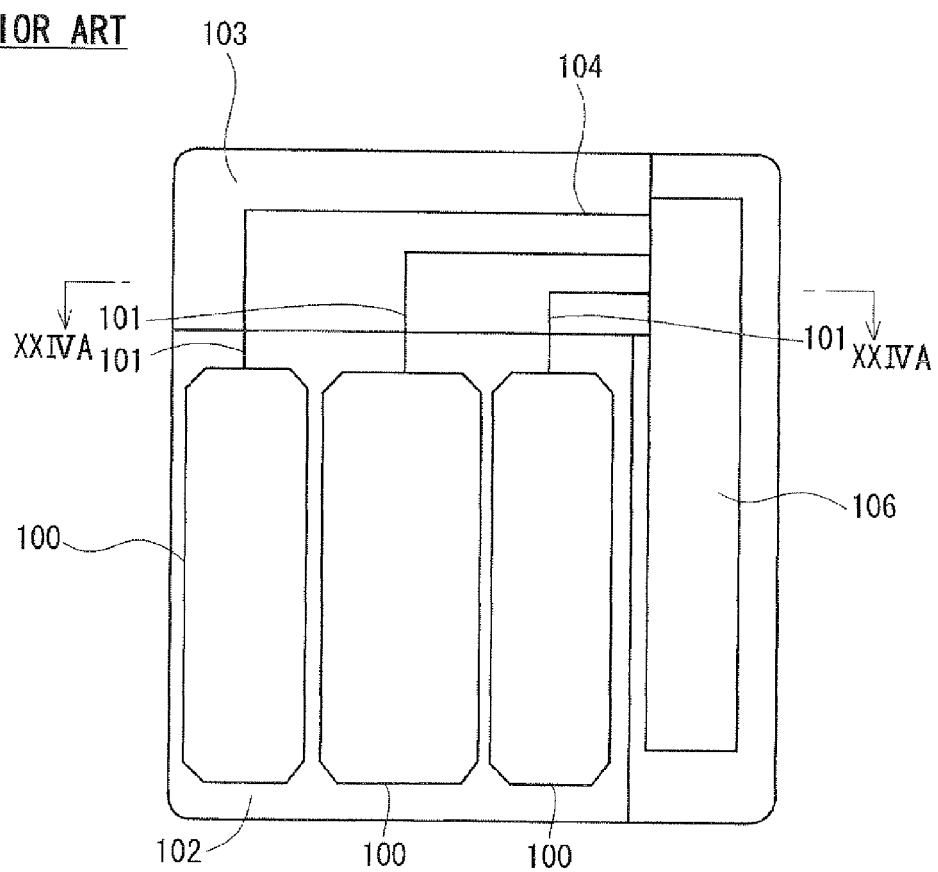
FIG. 24B is a simplified diagram illustrating a vertical cross-sectional view of a conventional motor.

For example, the embodiments described above can be summarized as follows. In the motor 10 according to the embodiments, as shown in FIGS. 23A and 23B, a lead wire 101 of a winding corresponding to one phase and a lead wire 109 of a winding corresponding to another phase approach each other at a predetermined position within an operation region 102. The lead wires 101, 109 extend parallel to each other from the predetermined position to cross over from the operation region 102 to a control region 107 through an interface therebetween and are directly connected to a corresponding driving module 108. In such an approach, the motor 10 according to the embodiments does not need the busbar 104 and the holder 103 shown in FIGS. 24A and 24B. Therefore, the size of the motor 10 can be smaller than the size of the conventional motor shown in FIGS. 24A and 24B.

MODIFICATIONS

The embodiments described above can be modified in various ways, for example, as follows.

In the embodiments, the motor 10 is used in an electric power steering. Alternatively, the motor 10 can be used in a system other than an electric power steering. For example, the motor 10 can be used in a wiper system, a valve timing control system, or the like.

In the embodiments, the coil wire is wound around each stator pole of the stator 20. Alternatively, the coil wire can be wound around each two stator poles of the motor.

In the second embodiment, the three phase windings are delta-connected and spaced 120 degrees apart. In the third embodiment, the three phase windings are Y-connected. Alternatively, the three phase windings can be Y-connected and spaced 120 degrees apart.

In the first to fifth embodiments, and the seventh embodiment, the coil wire is wound around twelve stator poles of the stator 20. In the sixth embodiment, the coil wire is wound around twenty-four stator poles of the stator 20. In the eighth embodiment, the coil wire is wound around eighteen stator poles of the stator 20. Alternatively, the number of stator poles of the stator 20 can vary from these numbers.

In the fourth and seventh embodiments, three-phase winding sets are controlled and energized by a common inverter circuit. In the first, third, and eighth embodiments, three-phase winding sets are controlled and energized by two independent inverter circuits. In the fifth and sixth embodiments, three-phase winding sets are controlled and energized by four independent inverter circuits. Alternatively, the number of inverter circuits for controlling and energizing the three-phase winding sets can vary from these numbers.

In the embodiments, the motor 10 is a so-called inner rotor motor. Alternatively, the motor 10 can be a so-called outer rotor motor.

Such changes and modifications are to be understood as being within the scope of the present invention as defined by the appended claims.

What is claimed is:

1. A motor comprising:
a motor casing having a surrounding wall that extends in an axial direction of the motor;
a stator fixed to the surrounding wall of the motor casing and including a plurality of stator poles projecting in a radial direction, the stator further including a plurality of windings wound around the plurality of stator poles to form a three-phase winding set, the stator configured to generate a rotating magnetic field upon energization of the three-phase winding set;
a rotor having N and S poles that are alternately arranged in a rotation direction, the rotor facing the stator in the radial direction to rotate with the rotating magnetic field in the rotation direction; and
a plurality of driving modules located on the opposite side of the stator and the rotor in the axial direction, the plurality of driving modules configured to form an inverter circuit for generating three phase alternating current to energize the three-phase winding set, each driving module having a pair of switching elements and a common terminal connected to the pair of switching elements, one switching element serving as a power supply side switching element, the other switching element serving as a ground side switching element, wherein
the plurality of windings has a jumping wire and a lead wire,
the jumping wire extends in a first direction perpendicular to the axial direction at an end of the stator in the axial direction and is connected between different windings of the three-phase winding set, and
the lead wire extends in the axial direction and is connected to the common terminal.

2. The motor according to claim 1, wherein
the lead wire of the winding corresponding to one phase and the lead wire of the winding corresponding to another phase extend in a second direction perpendicular to the axial direction at the end of the stator and approach each other at a predetermined position, and
the lead wires approaching each other are bent at the predetermined position to extend parallel to each other in the axial direction and connected together to the common terminal.

3. The motor according to claim 1, wherein
the motor casing further has a side wall located at an end of the surrounding wall in the axial direction, the side wall projecting in the radial direction to define an operation region and a control region,
the stator and the rotor are located in the operation region,
the plurality of driving modules is located in the control region, and
the lead wire extends in the axial direction to cross over from the operation region to the control region through the side wall.

4. The motor according to claim 3, wherein
the three-phase winding set comprises a plurality of three-phase winding sets, and the inverter circuit comprises a plurality of inverter circuits for controlling energization of the plurality of three-phase winding sets independently.

5. The motor according to claim 4, wherein
the lead wire of the winding corresponding to one phase and the lead wire of the winding corresponding to another phase approach each other on a control region side of the common terminal in the axial direction, and
the lead wires approaching each other extend straightly in the axial direction to cross over from the control region to the operation region.

6. The motor according to claim 4, wherein
the same phase windings of the plurality of three-phase winding sets are symmetrically arranged with respect to a rotation axis of the rotor.

7. The motor according to claim 4, wherein
the same phase windings of the plurality of three-phase winding sets are substantially equally spaced from each other in the rotation direction.

8. The motor according to claim 4, wherein
in each of the plurality of three-phase winding sets, different phase windings are located adjacent to each other in the rotation direction.

9. The motor according to claim 4, wherein
in each of the plurality of three-phase winding sets, different phase windings are spaced about 120 degrees apart in the rotation direction.

10. The motor according to claim 2, wherein
one winding of a first one of the plurality of three-phase winding sets is electrically connected to one winding of a second one of the plurality of three-phase winding sets, and the first one of the plurality of three-phase winding sets and
the second one of the plurality of three-phase winding sets are located adjacent to each other in the rotation direction and formed from a single continuous wire.

11. The motor according to claim 10, wherein
the one winding of the first one of the plurality of three-phase winding sets and the one winding of the second one of the plurality of three-phase winding sets are located adjacent to each other in the rotation direction and connected together by the jumping wire or the lead wire.

12. The motor according to claim 1, wherein
the lead wire of the winding corresponding to one phase and the lead wire of the winding corresponding to another phase approach each other within the operation region by extending straightly within an area defined by the plurality of stator poles of the stator in the radial direction.

13. The motor according to claim 1, wherein
the motor casing includes a tube portion defining the surrounding wall, a side wall located at an end of the tube portion in the axial direction and projecting in the radial direction, and a ring-shaped heatsink projecting from the side wall in the axial direction, and
the plurality of driving modules is bonded to the heatsink and arranged in a circumferential direction in a such a manner that the plurality of driving modules is coaxial with the plurality of stator poles of the stator, and
the lead wire extends through the side wall and is directly connected to the common terminal.

14. The motor according to claim 13, wherein
the plurality of stator poles is fixed to an inner surface of the tube portion and projects in the radial direction,
the heatsink is located inwardly with respect to the tube portion in the radial direction, and
the plurality of driving modules is bonded to an outer surface of the heatsink in the radial direction.

15. The motor according to claim 13, wherein
the plurality of driving modules is bonded to an inner surface of the heatsink in the radial direction.

* * * * *